US012759286B2

(12) United States Patent
Xu et al.

(10) Patent No.: US 12,759,286 B2
(45) Date of Patent: Oct. 13, 2026

(54) ABNORMALITY DETERMINATION METHOD FOR LIQUID EJECTING HEAD, AND LIQUID EJECTING APPARATUS

(71) Applicant: SEIKO EPSON CORPORATION, Tokyo (JP)

(72) Inventors: Siyuan Xu, Oshino-mura (JP); Akira Miyagishi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 232 days.

(21) Appl. No.: 18/616,987

(22) Filed: Mar. 26, 2024

(65) Prior Publication Data

US 2024/0326409 A1 Oct. 3, 2024

(30) Foreign Application Priority Data

Mar. 29, 2023 (JP) ................................ 2023-052733

(51) Int. Cl.
*B41J 2/045* (2006.01)

(52) U.S. Cl.
CPC ......... *B41J 2/0451* (2013.01); *B41J 2/04581* (2013.01); *B41J 2/04588* (2013.01)

(58) Field of Classification Search
CPC .. B41J 2/04581; B41J 2/0451; B41J 2/04588; B41J 2/04541; B41J 2/14233; B41J 2/04593; B41J 2/055
See application file for complete search history.

(56) References Cited

U.S. PATENT DOCUMENTS 6,481,833 B1 * 11/2002 Fujii .................... B41J 2/04581 347/68
2004/0223027 A1 11/2004 Shinkawa
2004/0252151 A1 12/2004 Higuchi
2005/0116977 A1 * 6/2005 Shinkawa ............ B41J 2/04578 347/14
2005/0205687 A1 * 9/2005 Chang .................. B41J 2/14201 239/102.1
2005/0212845 A1 * 9/2005 Shinkawa ............ B41J 2/16579 347/81

(Continued)

FOREIGN PATENT DOCUMENTS

JP 2004-291473 A 10/2004
JP 2013-144451 A 7/2013
JP 2013-233656 A 11/2013

*Primary Examiner* — John P Zimmermann
(74) *Attorney, Agent, or Firm* — WORKMAN NYDEGGER

(57) ABSTRACT

An abnormality determination method for a liquid ejecting head including a plurality of ejecting portions including a nozzle, a pressure chamber, a first electrode, a second electrode, and a piezoelectric body, and a liquid storage portion that communicates with each of the plurality of ejecting portions, the method including: holding a voltage between the first electrode and the second electrode of a first ejecting portion at a constant voltage in a first period; supplying a drive signal for applying a pressure fluctuation to the liquid in the pressure chamber of a second ejecting portion, to one of the first electrode and the second electrode of the second ejecting portion in the first period; detecting a residual vibration of the first ejecting portion, in a second period following the first period; and determining whether or not the liquid ejecting head has an abnormality based on the residual vibration.

20 Claims, 19 Drawing Sheets

(56) References Cited

U.S. PATENT DOCUMENTS

| | | | | |
|---|---|---|---|---|
| 2011/0032310 | A1* | 2/2011 | Owaki | B41J 2/1623 347/70 |
| 2013/0293610 | A1 | 11/2013 | Suzuki | |
| 2014/0285554 | A1* | 9/2014 | Yanaka | B41J 2/14274 347/11 |
| 2017/0305146 | A1* | 10/2017 | Mihailovic | B41J 2/04596 |
| 2020/0094547 | A1* | 3/2020 | Saito | B41J 2/04551 |
| 2022/0153021 | A1* | 5/2022 | Katakura | B41J 2/04588 |
| 2023/0010747 | A1* | 1/2023 | Sato | B41J 2/04581 |
| 2024/0190127 | A1* | 6/2024 | Toshima | B41J 2/0451 |

* cited by examiner

FIG. 7

| Sd[m] | DESIGNATION CONTENT OF Sd[m] | Qa[m] | | Qb[m] | | | Qs[m] | | |
|---|---|---|---|---|---|---|---|---|---|
| | | Tu1 | Tu2 | TSS1 | TSS2 | TSS3 | TSS1 | TSS2 | TSS3 |
| 1 | LARGE DOT | H | H | L | L | L | L | L | L |
| 2 | MEDIUM DOT | H | L | L | L | L | L | L | L |
| 3 | SMALL DOT | L | H | L | L | L | L | L | L |
| 4 | NO RECORDING | L | L | L | L | L | L | L | L |
| 5 | DETECTION TARGET | L | L | H | L | H | L | H | L |

FIG. 9

| | | TSu1 | | | TSu2 | | |
|---|---|---|---|---|---|---|---|
| | | Qa | Qb | Qs | Qa | Qb | Qs |
| DETECTION TARGET EJECTING PORTION [i] | Sd[i]=6 | L | H | L | L | L | H |
| DRIVE TARGET EJECTING PORTION [j] | Sd[j]=7 | H | L | L | H | L | L |

FIG. 19

| | | TSu1 | | | | TSu2 | | | |
|---|---|---|---|---|---|---|---|---|---|
| | | Qa | Qb | Qc | Qs | Qa | Qb | Qc | Qs |
| DETECTION TARGET EJECTING PORTION [i] | Sd[i]=6 | L | H | L | L | L | L | L | H |
| DRIVE TARGET EJECTING PORTION [j] | Sd[j]=7 | H | L | L | L | H | L | L | L |
| HALT TARGET EJECTING PORTION [k] | Sd[k]=8 | L | L | H | L | L | L | H | L |

ABNORMALITY DETERMINATION METHOD FOR LIQUID EJECTING HEAD, AND LIQUID EJECTING APPARATUS

The present application is based on, and claims priority from JP Application Serial Number 2023-052733, filed Mar. 29, 2023, the disclosure of which is hereby incorporated by reference herein in its entirety.

BACKGROUND

1. Technical Field

The present disclosure relates to an abnormality determination method for a liquid ejecting head and a liquid ejecting apparatus.

2. Related Art

A liquid ejecting apparatus that prints an image by causing a plurality of nozzles to eject a liquid such as an ink by using a piezoelectric element is known. For example, the liquid ejecting apparatus includes a liquid ejecting head including a plurality of ejecting portions. Each ejecting portion includes a nozzle for ejecting the ink, a pressure chamber communicating with the nozzle, and the piezoelectric element. The piezoelectric element of each ejecting portion ejects the ink in the pressure chamber from the nozzle by contracting the pressure chamber in response to a drive signal. In this type of liquid ejecting apparatus, a method for detecting an ejection abnormality of the nozzle is proposed. For example, JP-A-2004-291473 discloses a method of detecting an ejection abnormality of a nozzle based on a vibration pattern of a residual vibration of a diaphragm that is displaced by driving of an actuator such as a piezoelectric element.

Meanwhile, when the method in the related art is used in a liquid ejecting head including a plurality of pressure chambers, for sequentially detecting an ejection abnormality of each nozzle based on a residual vibration sequentially detected from each of the plurality of pressure chambers, the following problem occurs. For example, in the method in the related art, when image printing is started and droplets are continuously ejected from a plurality of nozzles at the same time even when the ejection abnormality is not detected, a phenomenon in which velocities of the subsequent droplets are disturbed may occur. Therefore, in the liquid ejecting apparatus, it is desired to detect an abnormality of a liquid ejecting head that causes the phenomenon in which the velocities of the subsequent droplets are disturbed when the droplets are ejected continuously from the plurality of nozzles at the same time.

SUMMARY

According to an aspect of the present disclosure, there is provided an abnormality determination method for a liquid ejecting head including a liquid storage portion that stores a liquid, and a plurality of ejecting portions, in which each of the plurality of ejecting portions includes a nozzle that ejects the liquid, a pressure chamber that communicates with the nozzle, a first electrode, a second electrode, and a piezoelectric body that is disposed between the first electrode and the second electrode and is driven to apply a pressure fluctuation to the liquid in the pressure chamber, and the liquid storage portion communicates with the pressure chamber of each of the plurality of ejecting portions via an individual flow path, the method including: holding a voltage between the first electrode and the second electrode of a first ejecting portion among the plurality of ejecting portions at a constant voltage in a first period; supplying a drive signal including a drive pulse for applying a pressure fluctuation to the liquid in the pressure chamber of a second ejecting portion different from the first ejecting portion among the plurality of ejecting portions, to one of the first electrode and the second electrode of the second ejecting portion in the first period; detecting a residual vibration, which is a vibration of the liquid in the pressure chamber of the first ejecting portion, in a second period following the first period; and determining whether or not the liquid ejecting head has an abnormality based on the residual vibration.

Further, according to another aspect of the present disclosure, there is provided a liquid ejecting apparatus including: a liquid ejecting head; a determination portion that determines whether or not the liquid ejecting head has an abnormality; and a control portion that controls the liquid ejecting head and the determination portion, in which the liquid ejecting head includes a plurality of ejecting portions including a nozzle that ejects a liquid, a pressure chamber that communicates with the nozzle, a first electrode, a second electrode, and a piezoelectric body that is disposed between the first electrode and the second electrode and is driven to apply a pressure fluctuation to the liquid in the pressure chamber, and a liquid storage portion that communicates with the pressure chamber of each of the plurality of ejecting portions via an individual flow path and stores the liquid, the control portion controls the liquid ejecting head to hold a voltage between the first electrode and the second electrode of a first ejecting portion among the plurality of ejecting portions at a constant voltage in a first period, supply a drive signal including a drive pulse for applying a pressure fluctuation to the liquid in the pressure chamber of a second ejecting portion different from the first ejecting portion among the plurality of ejecting portions, to one of the first electrode and the second electrode of the second ejecting portion in the first period, and detect a residual vibration, which is a vibration of the liquid in the pressure chamber of the first ejecting portion, in a second period following the first period, and the determination portion determines whether or not the liquid ejecting head has an abnormality based on the residual vibration.

BRIEF DESCRIPTION OF THE DRAWINGS

FIG. 7 is an explanatory diagram illustrating generation of a coupling state designation signal by a coupling state designation circuit.

FIG. 9 is an explanatory diagram illustrating the generation of the coupling state designation signal by the coupling state designation circuit.

FIG. 19 is an explanatory diagram illustrating generation of a coupling state designation signal by a coupling state designation circuit.

DESCRIPTION OF EMBODIMENTS

Figure 1:
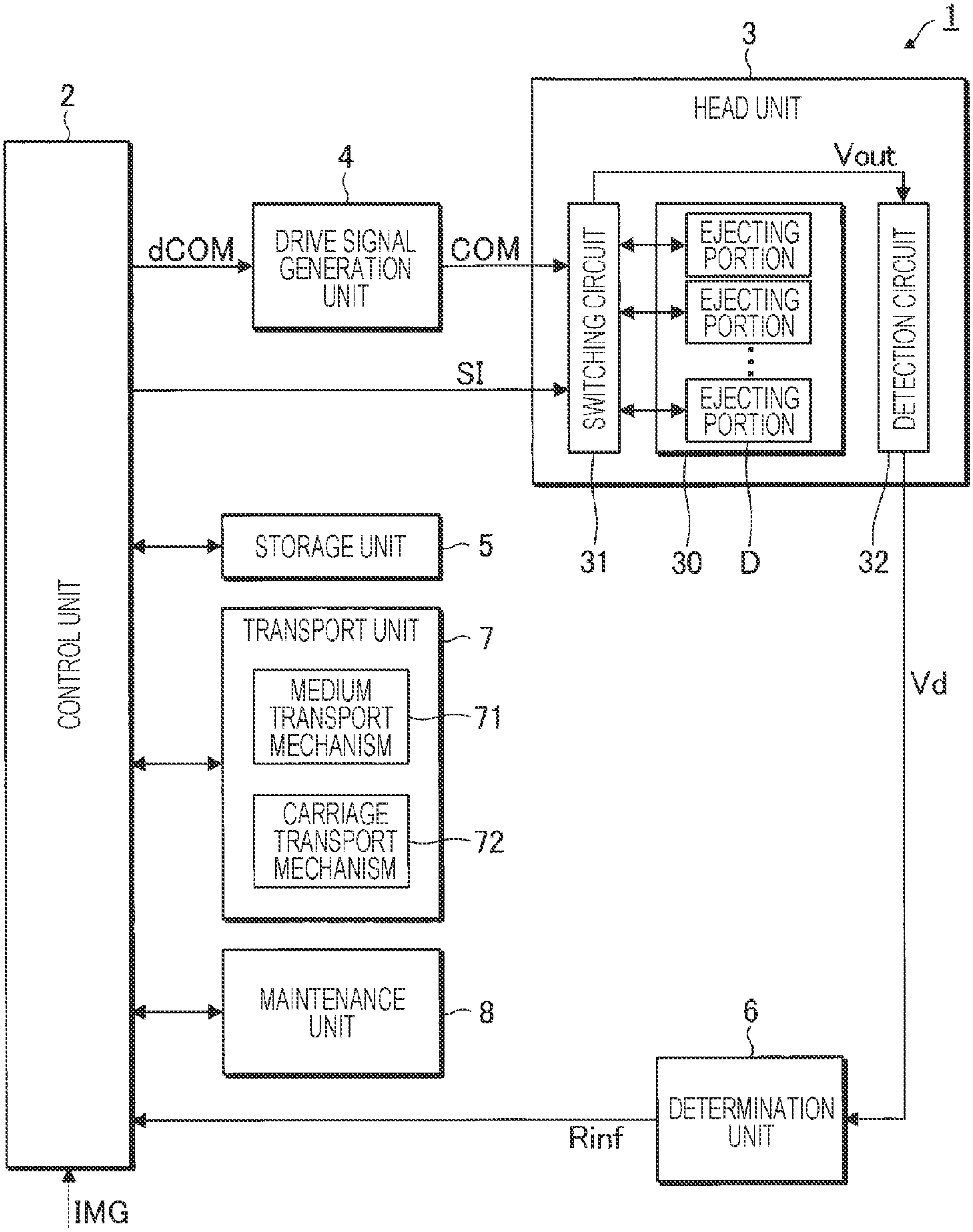
FIG. 1 is a block diagram illustrating an example of a configuration of an ink jet printer according to an embodiment of the present disclosure.

Hereinafter, embodiments for carrying out the present disclosure will be described with reference to the drawings. Meanwhile, a dimension and a scale of each portion are different from actual ones as appropriate in each drawing. The embodiments described below are preferred specific examples of the present disclosure and are thus added with technically preferred various limitations, but the scope of the present disclosure is not limited to such embodiments unless description for limiting the present disclosure is made in the following description.

1. Embodiment

In the present embodiment, a liquid ejecting apparatus will be described by using an ink jet printer that forms an image on a recording paper sheet by ejecting an ink as an example. In the present embodiment, the ink is an example of a "liquid". First, a configuration of an ink jet printer 1 according to the present embodiment will be described with reference to FIG. 1.

For example, print data IMG indicating an image to be formed by the ink jet printer 1 is supplied to the ink jet printer 1 from a host computer such as a personal computer or a digital camera. The ink jet printer 1 executes a printing process of forming the image indicated by the print data IMG supplied from the host computer on a medium. In the present embodiment, a recording paper sheet PP illustrated in FIG. 2 to be described below is assumed as the medium.

The ink jet printer 1 includes a control unit 2 that controls each portion of the ink jet printer 1, a head unit 3 provided with an ejecting portion D for ejecting inks, and a drive signal generation unit 4 that generates a plurality of drive signals COM for driving the ejecting portion D. Further, the ink jet printer 1 includes a storage unit 5 that stores various types of information such as the print data IMG and a control program of the ink jet printer 1, and a determination unit 6 that determines whether or not the head unit 3 has an abnormality. Further, the ink jet printer 1 includes a transport unit 7 for changing a relative position of the recording paper sheet PP with respect to the head unit 3, and a maintenance unit 8 for executing a maintenance process for maintaining the ejecting portion D provided in the head unit 3. The control unit 2 is an example of a "control portion", and the determination unit 6 is an example of a "determination portion".

In the present embodiment, it is assumed that the head unit 3 and the drive signal generation unit 4 correspond to each other. Further, in the present embodiment, it is assumed that the head unit 3 and the determination unit 6 correspond to each other. For example, the ink jet printer 1 may include a plurality of head units 3, a plurality of drive signal generation units 4 corresponding to the plurality of head units 3 on a one-to-one basis, and a plurality of determination units 6 corresponding to the plurality of head units 3 on a one-to-one basis. Alternatively, the ink jet printer 1 may include one head unit 3, one drive signal generation unit 4 corresponding to the one head unit 3, and one determination unit 6 corresponding to the one head unit 3.

In the present embodiment, it is assumed that the ink jet printer 1 includes four head units 3, four drive signal generation units 4 corresponding to the four head units 3 on a one-to-one basis, and four determination units 6 corresponding to the four head units 3 on a one-to-one basis. Meanwhile, in the following, for convenience of description, as illustrated in FIG. 1, a description will be given by focusing on one head unit 3 among the four head units 3, one drive signal generation unit 4 provided corresponding to the one head unit 3 among the four drive signal generation units 4, and one determination unit 6 provided corresponding to the one head unit 3 among the four determination units 6. The head unit 3 is an example of a "liquid ejecting head".

The control unit 2 is configured with one or a plurality of central processing units (CPU). The control unit 2 may be configured with a programmable logic device such as a field-programmable gate array (FPGA), instead of the CPU or in addition to the CPU. In addition, the control unit 2 operates according to a control program stored in the storage unit 5 to generate signals such as a printing signal SI and a waveform designation signal dCOM for controlling an operation of each portion of the ink jet printer 1.

Figure 6:
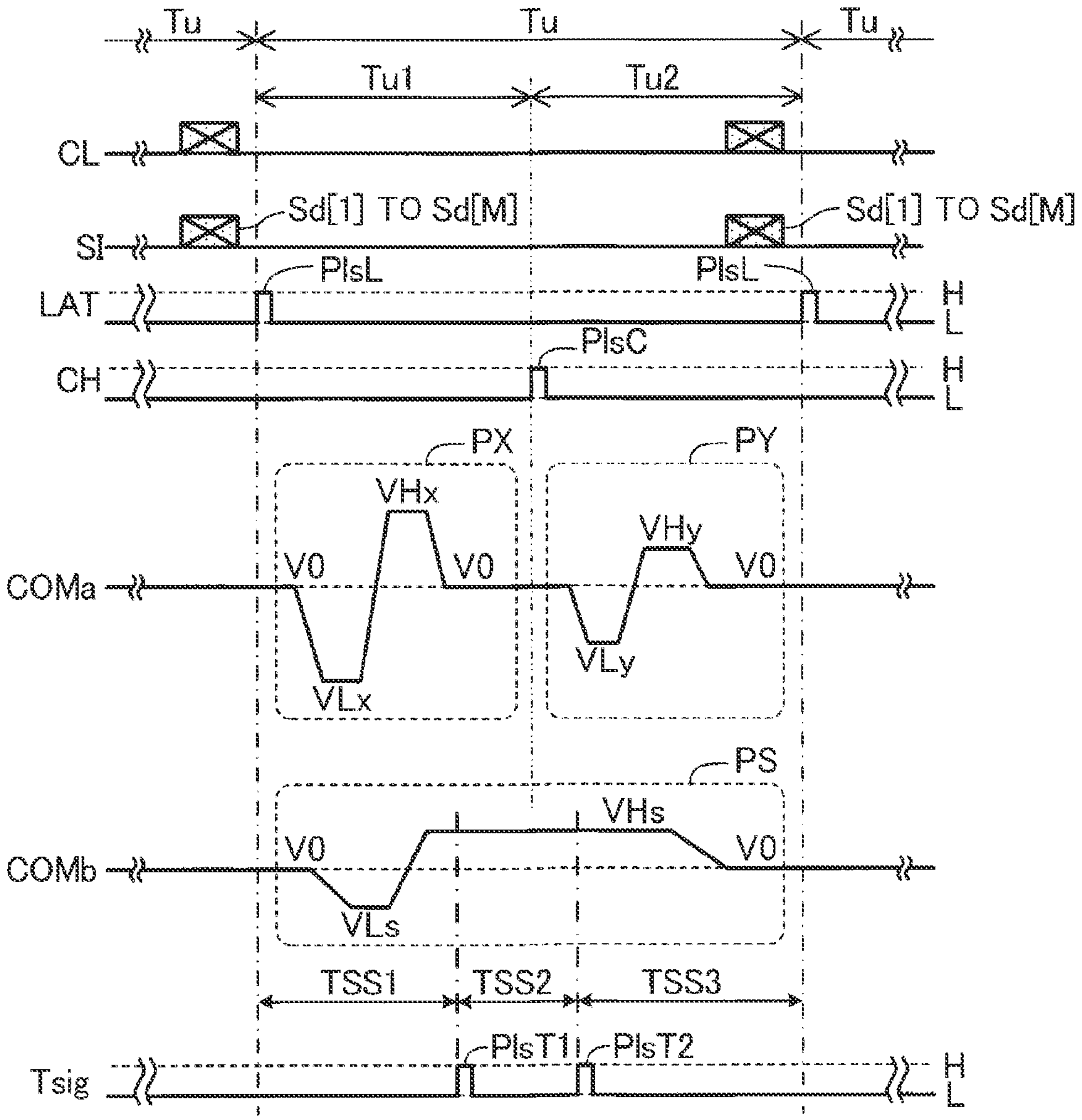
FIG. 6 is a timing chart illustrating an example of an operation of the ink jet printer during a unit period.

Here, the waveform designation signal dCOM is a digital signal that defines each of waveforms of the plurality of drive signals COM. In addition, each drive signal COM is an analog signal used to drive the ejecting portions D. In the present embodiment, as illustrated in FIG. 6 and the like to be described below, it is assumed that the plurality of drive signals COM include a drive signal COMa, a drive signal COMb, and the like. The printing signal SI is a digital signal for designating a type of operation of the ejecting portion D. Specifically, the printing signal SI is a signal for designating the type of operation of the ejecting portion D by designating whether or not to supply each drive signal COM to the ejecting portion D.

The drive signal generation unit 4 includes, for example, a digital analog converter (DAC), and generates the plurality of drive signals COM based on the waveform designation signal dCOM supplied from the control unit 2. For example, each of the plurality of drive signals COM generated by the drive signal generation unit 4 includes a waveform defined by the waveform designation signal dCOM. The drive signal generation unit 4 outputs the plurality of drive signals COM generated based on the waveform designation signal dCOM to a switching circuit 31 included in the head unit 3.

The storage unit 5 is configured to include one or both of a volatile memory such as a random access memory (RAM), and a non-volatile memory such as a read only memory (ROM), an electrically erasable programmable read-only memory (EEPROM), or a programmable ROM (PROM). The storage unit 5 may be included in the control unit 2.

The head unit 3 has the switching circuit 31, a recording head 30, and a detection circuit 32.

The recording head 30 includes M ejecting portions D. A value of M is a natural number of 1 or more. Hereinafter, among the M ejecting portions D provided in the recording head 30, an m-th ejecting portion D may be referred to as an ejecting portion D[m]. In this case, the variable m is a natural number that satisfies "1≤m≤M". In the following description, when a component, a signal, or the like of the ink jet printer 1 corresponds to the ejecting portion D[m] among the M ejecting portions D, a reference numeral for representing the component, the signal, or the like may be added with the subscript [m].

The switching circuit 31 switches whether or not to supply each drive signal COM to the ejecting portion D[m], based on the printing signal SI. In the following, as illustrated in FIG. 6 and the like to be described below, the drive signal COM supplied to the ejecting portion D[m] among the plurality of drive signals COM may be referred to as an individual drive signal Vin[m]. The switching circuit 31 switches whether or not to supply a detection signal Vout[m] indicating a potential of an upper electrode Zu[m] of a piezoelectric element PZ[m] included in the ejecting portion D[m] to the detection circuit 32 based on the printing signal SI. The piezoelectric element PZ[m] and the upper electrode Zu[m] will be described below with reference to FIG. 4.

The detection circuit 32 generates a residual vibration signal Vd[m] based on the detection signal Vout[m], and outputs the generated residual vibration signal Vd[m] to the determination unit 6. The residual vibration signal Vd[m] is used to determine whether or not the head unit 3 has an abnormality. In the present embodiment, a case is assumed in which as the determination on whether or not the head unit 3 has the abnormality, determination on whether or not the ejecting portion D[m] has an abnormality and determination on whether or not a liquid storage portion R that stores a liquid has an abnormality are performed. The liquid storage portion R will be described below in FIG. 4.

For example, the residual vibration signal Vd[m] used to determine whether or not the ejecting portion D[m] has the abnormality indicates a waveform of a residual vibration, which is a vibration remaining in the ejecting portion D[m] after the ejecting portion D[m] is driven by the individual drive signal Vin[m]. In addition, for example, the residual vibration signal Vd[m] used to determine whether or not the liquid storage portion R has the abnormality indicates a waveform of a residual vibration of the ejecting portion D[m] caused by a residual vibration remaining in the liquid storage portion R after the ejecting portion D other than the ejecting portion D[m] is driven by the individual drive signal Vin.

The determination unit 6 determines whether or not the head unit 3 has the abnormality or whether or not the liquid storage portion R has the abnormality, based on the residual vibration signal Vd[m]. In the present embodiment, it is assumed that the determination on whether or not the ejecting portion D[m] has the abnormality is performed in a printing process period during which a printing process is executed, and the determination on whether or not the liquid storage portion R has the abnormality is performed during a storage portion determination period different from the printing process period. The storage portion determination period may be included in a period during which a maintenance process is executed.

For example, in the printing process period, the determination unit 6 compares a detected value such as an amplitude and a period of the residual vibration signal Vd[m] with a reference value when an ejection state is normal to determine whether or not the ejecting portion D[m] has the abnormality. The determination unit 6 generates, for example, determination result information Rinf including information indicating whether or not the ejecting portion D[m] has the abnormality, and outputs the generated determination result information Rinf to the control unit 2. Hereinafter, the ejecting portion D[m] that is a detection target of the detection signal Vout[m] by the detection circuit 32 may be referred to as the detection target ejecting portion D.

In addition, for example, in the storage portion determination period, the determination unit 6 compares a detected value such as a period and an amplitude of the residual vibration signal Vd[m] with a reference value when a state of the liquid storage portion R is normal to determine whether or not the liquid storage portion R has the abnormality. The determination unit 6 may be included in the control unit 2. In addition, in the following, during the storage portion determination period, the ejecting portion D other than the detection target ejecting portion D, that is, the ejecting portion D driven by the individual drive signal Vin may be referred to as the drive target ejecting portion D. The detection target ejecting portion D in the storage portion determination period is an example of a "first ejecting portion", and the drive target ejecting portion D in the storage portion determination period is an example of a "second ejecting portion".

In the present embodiment, a method of using the residual vibration signal Vd[m] is assumed as a method of determining whether or not the ejecting portion D has an abnormality. Meanwhile, the method of determining whether or not the ejecting portion D has the abnormality is not limited to the method of using the residual vibration signal Vd[m]. For example, as the method of determining whether or not the ejecting portion D has the abnormality, a method of detecting a temperature decrease occurring in the ejecting portion D when an ink is ejected normally may be adopted. In this type of determination method, when a change point at which a temperature decrease rate is changed after a certain time from a time at which a detected temperature reaches the maximum temperature appears, an ink ejection state is determined as being normal, and, when the change point does not appear, the ink ejection state is determined as being abnormal. In addition, a method of determining whether or not the liquid storage portion R has the abnormality will be described below with reference to FIG. 8 and the following drawings.

As described above, in the present embodiment, the ink jet printer 1 executes the printing process. When the printing process is executed, the control unit 2 generates a signal for controlling the head unit 3 such as the printing signal SI based on the print data IMG. In addition, the control unit 2 generates a signal for controlling the drive signal generation unit 4, such as the waveform designation signal dCOM, when the printing process is executed. In addition, the control unit 2 generates a signal for controlling the transport unit 7 when the printing process is executed. Therefore, in the printing process, the control unit 2 adjusts the presence or absence of ejection of inks from the ejecting portion D[m], the ejecting amount of inks, an ejecting timing of the inks, and the like while controlling the transport unit 7 to change a relative position of the recording paper sheet PP with respect to the head unit 3. In this manner, the control unit 2 controls each portion of the ink jet printer 1 such that an image corresponding to the print data IMG is formed at the recording paper sheet PP.

The transport unit 7 includes a carriage transport mechanism 72 for reciprocating a carriage 721 and a medium transport mechanism 71 for transporting the recording paper sheet PP. The carriage 721 will be described below in FIG. 2.

As described above, in the present embodiment, the ink jet printer 1 executes the maintenance process. For example, the maintenance process includes flushing processing of ejecting inks from the ejecting portion D, wiping processing of wiping off a foreign matter such as an ink adhering to the vicinity of a nozzle N of the ejecting portion D with a wiper, and pumping processing of suctioning the ink in the ejecting portion D with a tube pump or the like. The nozzle N will be described below in FIG. 3.

The maintenance unit 8 includes an ejection ink receiving portion for receiving the ejected ink when the ink in the ejecting portion D is ejected, a wiper for wiping off a foreign matter such as an ink adhering to the vicinity of the nozzle N of the ejecting portion D, and a tube pump for suctioning the ink, air bubbles, and the like in the ejecting portion D, in the flushing processing. The ejection ink receiving portion, the wiper, and the tube pump are not illustrated.

Figure 2:
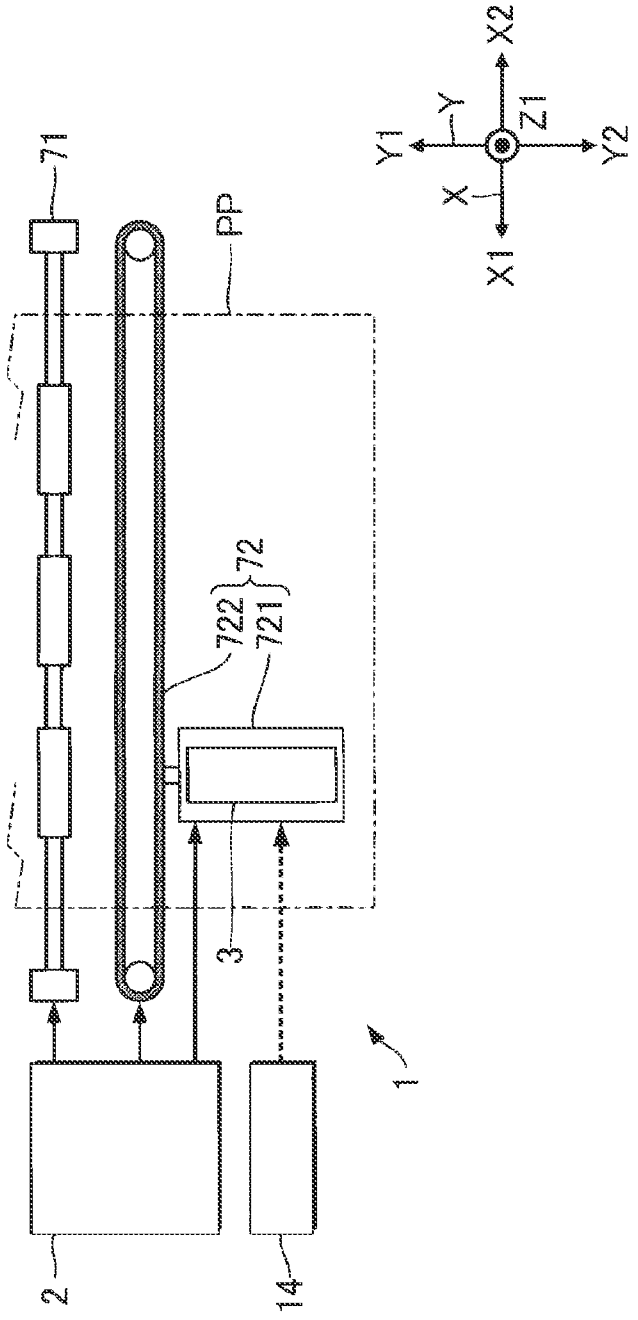
FIG. 2 is a configuration diagram schematically illustrating the ink jet printer.

FIG. 2 is a configuration diagram schematically illustrating the ink jet printer 1. As illustrated in FIG. 2, in the present embodiment, a case where the ink jet printer 1 is a serial printer is assumed as an example.

As illustrated in FIG. 2, the ink jet printer 1 has a liquid container 14 that stores inks in addition to the elements described in FIG. 1. For example, as the liquid container 14, a cartridge detachable from the ink jet printer 1, an ink pack in a bag shape formed of a flexible film, an ink tank capable of replenishing the ink, or the like can be adopted. A type of ink to be stored in the liquid container 14 is not particularly limited, and is selected in any desired way.

The medium transport mechanism 71 transports the recording paper sheet PP in a Y2 direction along a Y-axis under the control of the control unit 2. Hereinafter, a Y1 direction and the Y2 direction opposite to the Y1 direction are collectively referred to as a direction along the Y-axis. In addition, hereinafter, an X1 direction along an X-axis that intersects the Y-axis and an X2 direction opposite to the X1 direction are collectively referred to as a direction along the X-axis. In addition, hereinafter, a Z1 direction along a Z-axis that intersects the X-axis and the Y-axis and a Z2 direction opposite to the Z1 direction are collectively referred to as a direction along the Z-axis. In the present embodiment, as an example, description will be performed while assuming that the X-axis, the Y-axis, and the Z-axis are orthogonal to each other. Meanwhile, the present disclosure is not limited to such an aspect. The X-axis, the Y-axis, and the Z-axis may intersect each other.

The carriage transport mechanism 72 reciprocates the head unit 3 in the X1 direction and the X2 direction under the control of the control unit 2. As illustrated in FIG. 2, the carriage transport mechanism 72 includes the substantially box-shaped carriage 721 accommodating the head unit 3 and an endless belt 722 to which the carriage 721 is fixed. The liquid container 14 may be stored in the carriage 721 together with the head unit 3.

Figure 3:
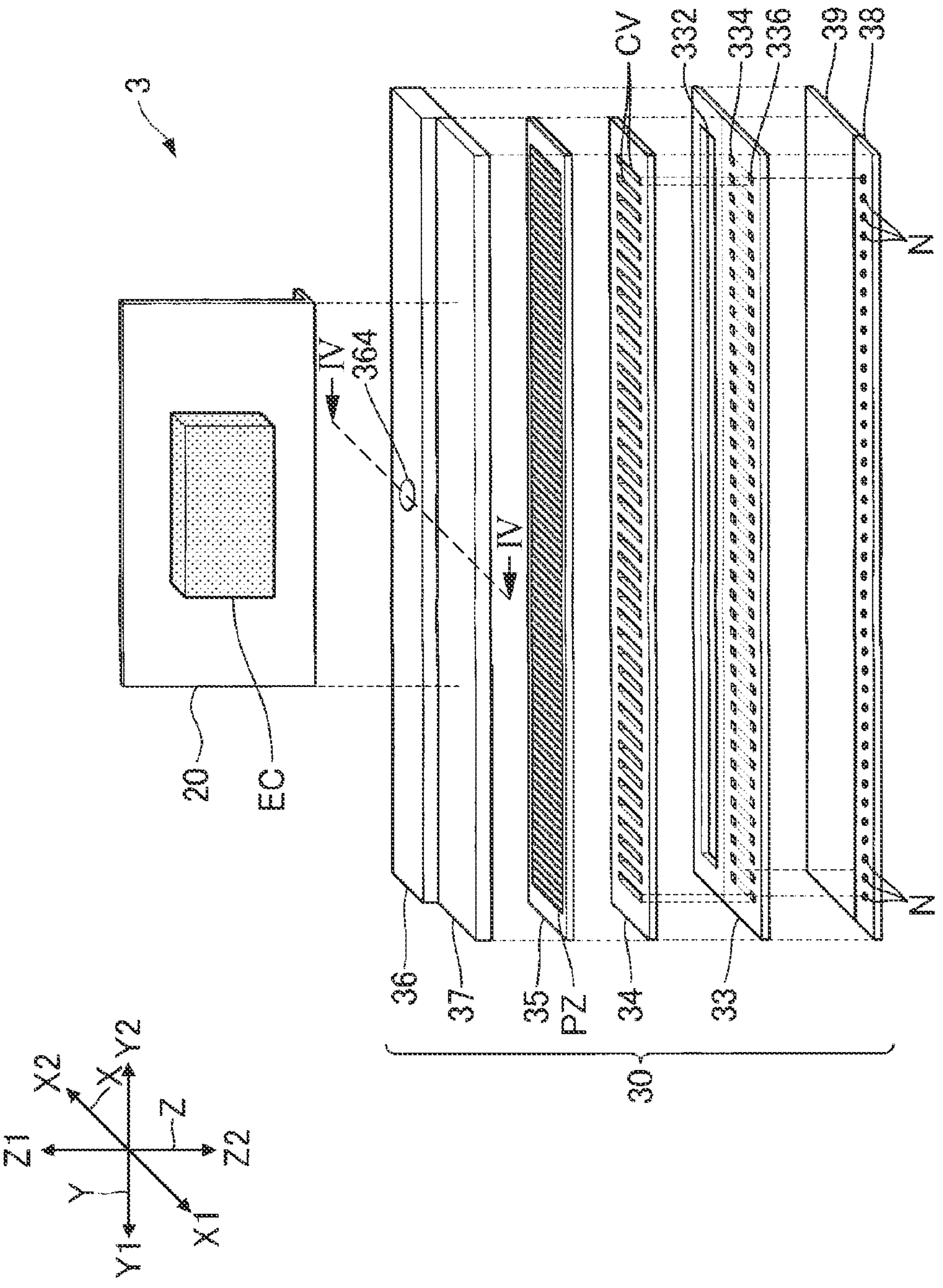
FIG. 3 is an exploded perspective view of a head unit.
Figure 4:
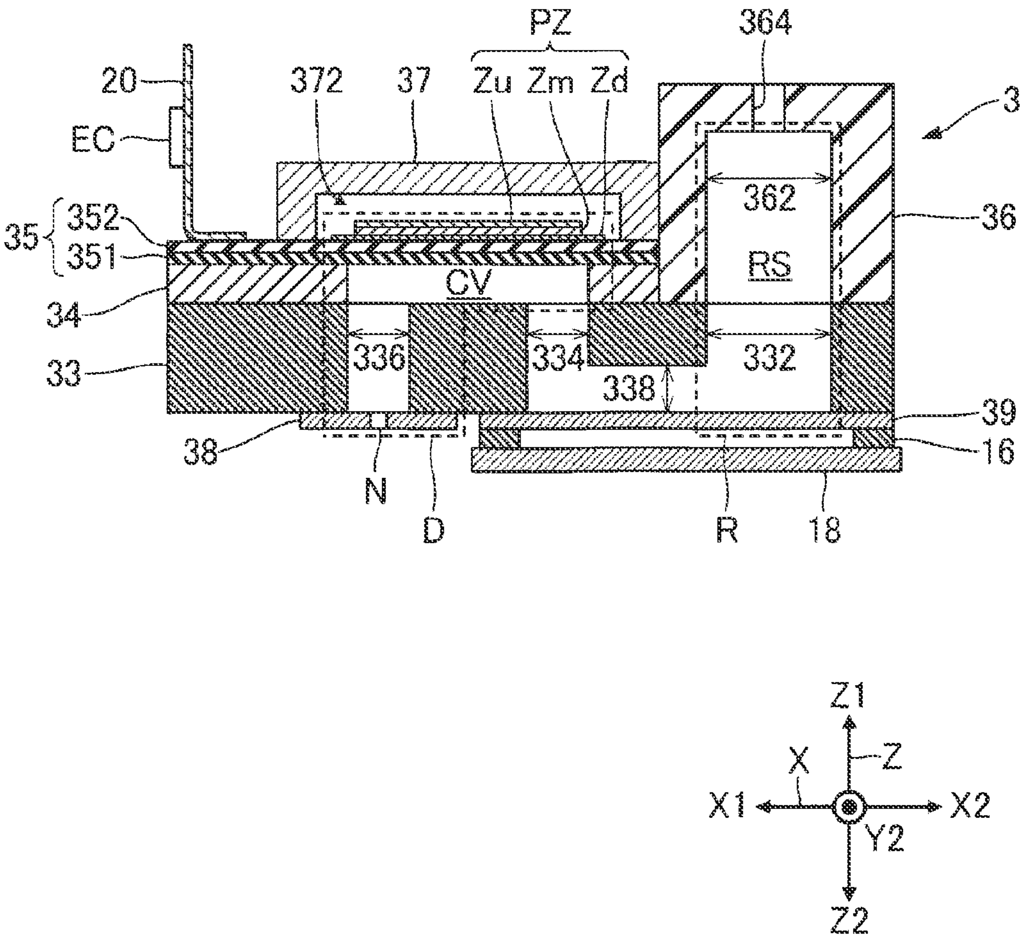
FIG. 4 is a cross-sectional diagram taken along line IV-IV illustrated in FIG. 3.

FIG. 3 is an exploded perspective view of the head unit 3. FIG. 4 is a cross-sectional diagram taken along line IV-IV illustrated in FIG. 3. The IV-IV cross section is parallel to the XZ plane, and passes through an introduction port 364 described below.

As illustrated in FIGS. 3 and 4, the head unit 3 includes a wiring substrate 20 on which an electronic component EC is mounted, a flow path substrate 33, a pressure chamber substrate 34, a diaphragm 35, and M piezoelectric elements PZ, a case 36, a sealing plate 37, a nozzle substrate 38, and a vibration absorber 39. The electronic component EC includes, for example, an electric circuit such as the switching circuit 31 and the detection circuit 32.

Here, the pressure chamber substrate 34, the diaphragm 35, the M piezoelectric elements PZ, the case 36, and the sealing plate 37 are installed in a region located in the Z1 direction from the flow path substrate 33. On the other hand, the nozzle substrate 38 and the vibration absorber 39 are installed in a region located in the Z2 direction from the flow path substrate 33. Further, the wiring substrate 20 is provided on, for example, a surface of the sealing plate 37 in the Z1 direction. Each element of the head unit 3 is generally a plate-shaped member elongated in the direction along the Y-axis, and is joined to each other with an adhesive, for example. The vibration absorber 39 is an example of a "compliance portion".

As illustrated in FIG. 3, the nozzle substrate 38 is a plate-shaped member on which the M nozzles N arranged along the Y-axis are formed. Each of the nozzles N is a through-hole through which an ink passes. The flow path substrate 33, the pressure chamber substrate 34, and the nozzle substrate 38 are formed by processing, for example, a silicon single crystal substrate by a semiconductor manufacturing technology such as etching. Meanwhile, a material or a manufacturing method of each element of the head unit 3 is optional. The direction of the Y-axis can also be referred to as a direction in which the M nozzles N are arranged.

The flow path substrate 33 is a plate-shaped member for forming a flow path for inks. As illustrated in FIGS. 3 and 4, the flow path substrate 33 is formed with an opening portion 332, M supply flow paths 334, and M communication flow paths 336. The opening portion 332 is a through-hole that is continuous over the M nozzles N along the Y-axis in a plan view from the direction along the Z-axis. That is, the opening portion 332 is a long through-hole extending in the direction along the Y-axis. The supply flow path 334 and the communication flow path 336 are through-holes individually formed for each of the nozzles N. As illustrated in FIG. 4, a relay flow path 338 over the M supply flow paths 334 is formed at a surface of the flow path substrate 33 in the Z2 direction. The relay flow path 338 is a flow path that allows the opening portion 332 and the M supply flow paths 334 to communicate with each other. The supply flow path 334 is an example of an "individual flow path".

The pressure chamber substrate 34 is a plate-shaped member in which M pressure chambers CV respectively corresponding to the M nozzles N are formed. The pressure chamber CV is located between the flow path substrate 33 and the diaphragm 35, and is a space called a cavity for applying pressure to an ink filled in the pressure chamber CV. The M pressure chambers CV are arranged in the direction along the Y-axis. Each pressure chamber CV is configured with a hole that opens at both surfaces of the pressure chamber substrate 34, and has a long shape extending in the direction along the X-axis. An end of each pressure chamber CV in the X2 direction communicates with the corresponding supply flow path 334 among the M supply flow paths 334. On the other hand, an end of each pressure chamber CV in the X1 direction communicates with the corresponding communication flow path 336 among the M communication flow paths 336.

The diaphragm 35 is installed on a surface of the pressure chamber substrate 34 in a direction opposite to a surface of the pressure chamber substrate 34, facing the flow path substrate 33. The diaphragm 35 is a plate-shaped member that is elastically deformable. As illustrated in FIG. 4, the diaphragm 35 includes an insulating film 352 and an elastic film 351 stacked in the direction along the Z-axis. The insulating film 352 is located in a direction opposite to the pressure chamber substrate 34 when viewed from the elastic film 351. The elastic film 351 is formed of, for example, silicon oxide. The insulating film 352 is formed of, for example, zirconium oxide.

Figure 10:
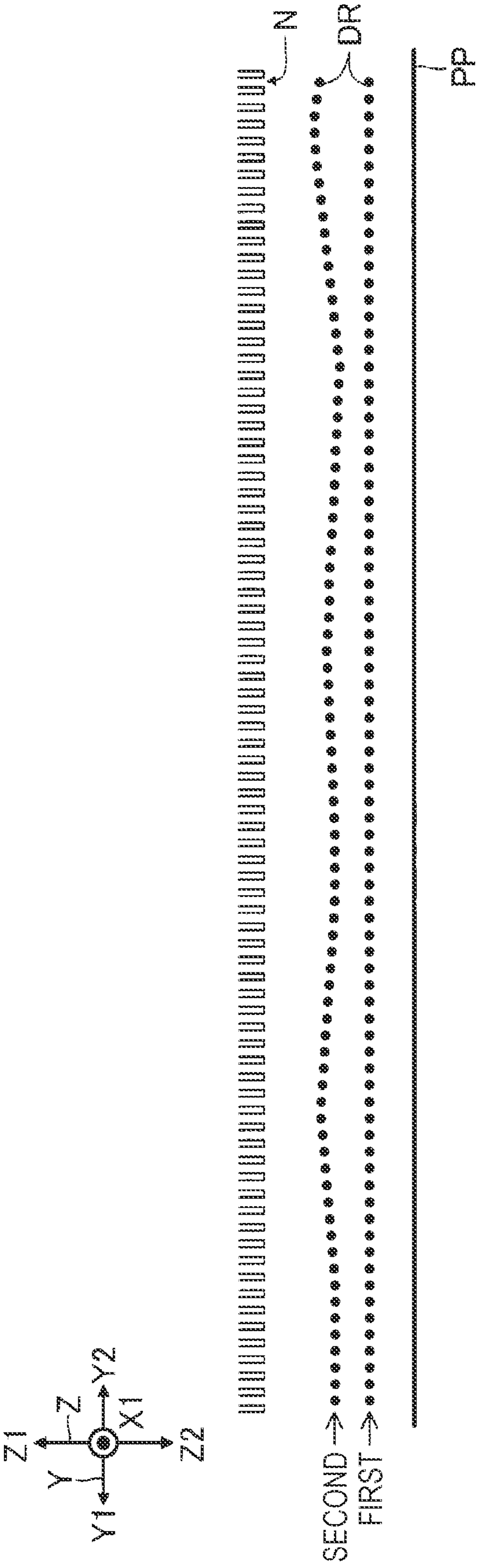
FIG. 10 is a diagram schematically illustrating a form of a droplet ejected from a nozzle when a liquid storage portion has an abnormality.

As can be understood from FIGS. 3 and 4, the flow path substrate 33 and the diaphragm 35 face each other at an interval inside each of the pressure chambers CV. The diaphragm 35 forms a part of a wall surface of the pressure chamber CV. An ink stored in a liquid storage chamber RS branches from the relay flow path 338 to each supply flow path 334, and is supplied to and filled into the M pressure chambers CV in parallel. That is, the liquid storage chamber RS functions as a common liquid chamber for supplying inks to the M pressure chambers CV. Therefore, for example, when inks are ejected from a plurality of nozzles N at the same time, a large pressure fluctuation occurs in the liquid storage chamber RS. When there is no abnormality in the liquid storage chamber RS and a vibration absorber 39 to be described below, the pressure fluctuation in the liquid storage chamber RS is absorbed by the vibration absorber 39. Meanwhile, when there is an abnormality in the liquid storage chamber RS or the vibration absorber 39, the pressure fluctuation in the liquid storage chamber RS is not absorbed, and as illustrated in FIG. 10 to be described below, an ejection velocity and the like of an ink droplet DR ejected from each of the plurality of nozzles N may vary. Therefore, detecting of the abnormality of the liquid storage chamber RS and the abnormality of the vibration absorber 39 is useful in quality management of the head unit 3. A portion including the liquid storage chamber RS and the vibration absorber 39 corresponds to the liquid storage portion R.

In the abnormality detection method of detecting an abnormality of the ejecting portion D for each ejecting portion D, it is difficult to detect the pressure fluctuation of the liquid storage chamber RS, so that it is difficult to detect the abnormality of the liquid storage portion R. Although the details will be described below with reference to FIG. 8 and the like, in the present embodiment, in addition to the determination on whether or not the ejecting portion D has the abnormality, a storage portion determination process of determining whether or not the liquid storage portion R has an abnormality is executed. Therefore, in the present embodiment, it is possible to detect the abnormality of the liquid storage portion R. The abnormality of the liquid storage portion R corresponds to, for example, an abnormality in which air bubbles remain in the liquid storage chamber RS, an abnormality in which the vibration absorber 39 adheres to a fixing plate 18 to be described below, and the like.

As illustrated in FIGS. 3 and 4, the M piezoelectric elements PZ respectively corresponding to the M nozzles N are installed on a surface of the diaphragm 35 in a direction opposite to the pressure chamber substrate 34. For example, for any m from 1 to M, the nozzle N[m] corresponds to the piezoelectric element PZ[m]. The nozzle N corresponding to the piezoelectric element PZ is the nozzle N communicating with the pressure chamber CV that partially or entirely overlaps with the piezoelectric element PZ in a plan view in the Z2 direction. Each of the piezoelectric elements PZ is an actuator that is deformed by the supply of the drive signal COM, and is formed in a long shape in a direction along the X-axis. The M piezoelectric elements PZ are arranged in the direction along the Y-axis to correspond to the M pressure chambers CV. When the drive signal COM is supplied to the piezoelectric element PZ and the diaphragm 35 vibrates in conjunction with deformation of the piezoelectric element PZ, pressure in the pressure chamber CV fluctuates. As the pressure in the pressure chamber CV fluctuates, the ink filled in the pressure chamber CV passes through the communication flow path 336 and the nozzle N, and is ejected. That is, the piezoelectric element PZ is a drive element that ejects the ink in the pressure chamber CV from the nozzle N by vibrating the diaphragm 35.

In the present embodiment, as illustrated in FIG. 6 to be described below, the drive signal COMb that vibrates the ink in the nozzle N to the extent that the ink in the nozzle N is not ejected may be supplied to the piezoelectric element PZ. In this case, when the diaphragm 35 vibrates in conjunction with the deformation of the piezoelectric element PZ due to the supply of the drive signal COMb to the piezoelectric element PZ, the pressure inside the pressure chamber CV fluctuates. Meanwhile, the ink inside the nozzle N only vibrates, and no ink is ejected from the nozzle N. In the following description, the vibration that causes the ink in the nozzle N to vibrate to the extent that the ink in the nozzle N is not ejected may be described as a micro-vibration.

As illustrated in FIG. 4, the piezoelectric element PZ includes the upper electrode Zu to which the drive signal COM is supplied, a lower electrode Zd to which a constant potential bias voltage signal VBS is supplied, and a piezoelectric body Zm provided between the upper electrode Zu and the lower electrode Zd. A potential of the bias voltage signal VBS is, for example, a ground level GND. A drive voltage supplied to the piezoelectric body Zm is, for example, a potential difference between the upper electrode Zu to which the drive signal COM is supplied and the lower electrode Zd to which the bias voltage signal VBS is supplied. Further, the pressure chamber CV is provided in the Z2 direction of a piezoelectric element PZ. One of the upper electrode Zu and the lower electrode Zd is an example of a “first electrode”, and the other of the upper electrode Zu and the lower electrode Zd is an example of a “second electrode”.

In FIG. 4, in order to avoid the drawing from being complicated, a wiring which is coupled to the upper electrode Zu and supplies the drive signal COM to the upper electrode Zu, and a wiring which is coupled to the lower electrode Zd and supplies the bias voltage signal VBS to the lower electrode Zd are not illustrated. In the present embodiment, a case is assumed in which the drive signal COM is supplied to the upper electrode Zu and the bias voltage signal VBS is supplied to the lower electrode Zd. Meanwhile, the bias voltage signal VBS may be supplied to the upper electrode Zu and the drive signal COM may be supplied to the lower electrode Zd.

Here, in the present embodiment, as an example, it is assumed that the piezoelectric element PZ is displaced in the Z2 direction by changing a potential of the individual drive signal Vin[m] supplied to the ejecting portion D[m] from a low potential to a high potential. That is, in the present embodiment, it is assumed that the volume of the pressure chamber CV provided in the ejecting portion D[m] is decreased when the potential of the individual drive signal Vin[m] supplied to the ejecting portion D[m] is high, in comparison with a case where the potential is low.

As illustrated in FIGS. 3 and 4, the case 36 is, for example, a structure manufactured by injection molding of a resin material, and is fixed to a surface of the flow path substrate 33 in the Z1 direction. As illustrated in FIG. 4, an accommodating portion 362 and the introduction port 364 are formed in the case 36. The accommodating portion 362 is a recess portion having a shape corresponding to the opening portion 332 of the flow path substrate 33. The introduction port 364 is a through-hole that communicates with the accommodating portion 362. A space of the opening portion 332 of the flow path substrate 33 and the accommodating portion 362 of the case 36 functions as the liquid storage chamber RS which is a reservoir which stores inks to be supplied to the M pressure chambers CV. The ink supplied from the liquid container 14 and passing through the introduction port 364 is stored in the liquid storage chamber RS.

The sealing plate 37 has a structure that protects the M piezoelectric elements PZ from the outside air and reinforces the mechanical strength of the pressure chamber substrate 34 and the diaphragm 35. The sealing plate 37 is fixed to a surface of the diaphragm 35 with, for example, an adhesive. As illustrated in FIG. 4, the sealing plate 37 has a recess portion on a facing surface with respect to the diaphragm 35. A sealing space 372 is formed by fixing the sealing plate 37 to the surface of the diaphragm 35. The M piezoelectric elements PZ are provided in the sealing space 372.

The vibration absorber 39 absorbs the pressure fluctuation in the liquid storage chamber RS. That is, the vibration absorber 39 absorbs the vibration of the inks stored in the liquid storage chamber RS. For example, the vibration absorber 39 includes a flexible sheet member capable of being elastically deformed. Specifically, the vibration absorber 39 is installed on a surface of the flow path substrate 33 in the Z2 direction such that a bottom surface of the liquid storage chamber RS is formed by closing the opening portion 332 of the flow path substrate 33, the relay flow path 338, and the plurality of supply flow paths 334.

As illustrated in FIG. 4, a frame body 16 is joined to a surface of the vibration absorber 39 in the Z2 direction with an adhesive or the like. For example, the frame body 16 is a frame-shaped member along the outer periphery of the vibration absorber 39, and is made of a metal material. The fixing plate 18 is joined to a surface of the frame body 16 in the Z2 direction by an adhesive or the like. The recording head 30 is fixed to the head unit 3 by joining of the frame body 16 to the fixing plate 18.

As described with reference to FIG. 1, the head unit 3 includes the recording head 30, the switching circuit 31, and the detection circuit 32. The head unit 3 also includes a wiring La to which the drive signal COMa is supplied from the drive signal generation unit 4, a wiring Lb to which the drive signal COMb is supplied from the drive signal generation unit 4, and a wiring Ls via which the detection signal Vout is supplied to the detection circuit 32. Further, the head unit 3 includes a wiring Li[m] that supplies the individual drive signal Vin[m] to the ejecting portion D[m] and a wiring Ld to which the bias voltage signal VBS is supplied. Further, the drive signal COMa is an example of a "drive signal".

The switching circuit 31 includes M switches Wa[1] to Wa[M] corresponding to the M ejecting portions D[1] to D[M] on a one-to-one basis, M switches Wb[1] to Wb[M] corresponding to the M ejecting portions D[1] to D[M] on a one-to-one basis, and M switches Ws[1] to Ws[M] corresponding to the M ejecting portions D[1] to D[M] on a one-to-one basis. Further, the switching circuit 31 includes a coupling state designation circuit 310. The coupling state designation circuit 310 designates a coupling state of each of the M switches Wa, the M switches Wb, and the M switches Ws. For example, the coupling state designation circuit 310 may generate coupling state designation signals Qa[m], Qb[m], and Qs[m], based on at least some of the printing signal SI, a latch signal LAT, a change signal CH, and a period defining signal Tsig supplied from the control unit 2. The coupling state designation signal Qa[m] is a signal for designating ON or OFF of the switch Wa[m], and the coupling state designation signal Qb[m] is a signal for designating ON or OFF of the switch Wb[m], and the coupling state designation signal Qs[m] is a signal for designation ON or OFF of the switch Ws[m].

The switch Wa[m] switches conduction and non-conduction between the wiring La and the upper electrode Zu[m] of the piezoelectric element PZ[m] provided in the ejecting portion D[m], based on the coupling state designation signal Qa[m]. That is, the switch Wa[m] switches conduction and non-conduction between the wiring La and the wiring Li[m] coupled to the upper electrode Zu[m], based on the coupling state designation signal Qa[m]. In the present embodiment, the switch Wa[m] is turned on when the coupling state designation signal Qa[m] is at a high level, and is turned off when the coupling state designation signal Qa[m] is at a low level. When the switch Wa[m] is turned on, the drive signal COMa supplied to the wiring La is supplied to the upper electrode Zu[m] of the ejecting portion D[m] as the individual drive signal Vin[m] via the wiring Li[m].

The switch Wb[m] switches conduction and non-conduction between the wiring Lb and the upper electrode Zu[m] of the piezoelectric element PZ[m] provided in the ejecting portion D[m], based on the coupling state designation signal Qb[m]. That is, the switch Wb[m] switches conduction and non-conduction between the wiring Lb and the wiring Li[m] coupled to the upper electrode Zu[m], based on the coupling state designation signal Qb[m]. In the present embodiment, the switch Wb[m] is turned on when the coupling state designation signal Qb[m] is at a high level, and is turned off when the coupling state designation signal Qb[m] is at a low level. When the switch Wb[m] is turned on, the drive signal COMb supplied to the wiring Lb is supplied to the upper electrode Zu[m] of the ejecting portion D[m] as the individual drive signal Vin[m] via the wiring Li[m].

The switch Ws[m] switches conduction and non-conduction between the wiring Ls and the upper electrode Zu[m] of the piezoelectric element PZ[m] provided in the ejecting portion D[m], based on the coupling state designation signal Qs[m]. That is, the switch Ws[m] switches conduction and non-conduction between the wiring Ls and the wiring Li[m] coupled to the upper electrode Zu[m], based on the coupling state designation signal Qs[m]. In the present embodiment, the switch Ws[m] is turned on when the coupling state designation signal Qs[m] is at a high level, and is turned off when the coupling state designation signal Qs[m] is at a low level.

For example, the coupling state designation signal Qs[m] enters a high level when the ejecting portion D[m] is the detection target ejecting portion D. Therefore, the switch Ws[m] is turned on, and the detection signal Vout[m]

indicating a potential of the upper electrode Zu[m] of the ejecting portion D[m] that is the detection target ejecting portion D is supplied to the detection circuit 32 via the wiring Li[m] and the wiring Ls. The detection circuit 32 generates the residual vibration signal Vd[m] based on the detection signal Vout[m].

As described above, the individual drive signal Vin[m] is a signal supplied to the piezoelectric element PZ[m] of the ejecting portion D[m] via the switch Wa[m] or Wb[m], among the drive signals COMa and COMb.

FIG. 6 is a timing chart illustrating an example of an operation of the ink jet printer 1 during a unit period Tu. In the present embodiment, when the ink jet printer 1 executes a printing process, a printing process period including one or a plurality of unit periods Tu are set as an operation period of the ink jet printer 1. The ink jet printer 1 according to the present embodiment may drive each ejecting portion D to perform the printing process in each unit period Tu. Further, the ink jet printer 1 according to the present embodiment can drive the detection target ejecting portion D, and detect the detection signal Vout[m] from the detection target ejecting portion D in each unit period Tu.

The control unit 2 outputs the latch signal LAT having a pulse PlsL and the change signal CH having a pulse PlsC. Therefore, the control unit 2 defines the unit period Tu as a period from rising of the pulse PlsL to rising of the next pulse PlsL. The control unit 2 divides the unit period Tu into two control periods Tu1 and Tu2 with the pulse PlsC.

The printing signal SI includes, for example, M individual designation signals Sd[1] to Sd[M] corresponding to the M ejecting portions D[1] to D[M] on a one-to-one basis. The individual designation signal Sd[m] designates an aspect of driving of the ejecting portion D[m] in each unit period Tu when the ink jet printer 1 executes the printing process.

The control unit 2 supplies the printing signal SI including the individual designation signals Sd[1] to Sd[M] to the coupling state designation circuit 310 in synchronization with the clock signal CL before each unit period Tu in which the printing process is executed. The coupling state designation circuit 310 generates the coupling state designation signals Qa[m], Qb[m], and Qs[m] based on the individual designation signal Sd[m] in the unit period Tu.

In the present embodiment, a case is assumed in which the ejecting portion D[m] can form any one of a large dot, a medium dot smaller than the large dot, and a small dot smaller than the medium dot in the unit period Tu. Hereinafter, the amount of ink corresponding to a large dot may be referred to as a large amount of ink, the amount of ink corresponding to a medium dot may be referred to as a medium amount of ink, and the amount of ink corresponding to a small dot may be referred to as a small amount of ink.

For example, the individual designation signal Sd[m] is a signal for designating any one driving aspect among five driving aspects such as ejection of a large amount of ink, ejection of a medium amount of ink, ejection of a small amount of ink, non-ejection of inks, and driving as the detection target ejecting portion D in each unit period Tu for the ejecting portion D[m]. In the present embodiment, in an example, a case is assumed in which the individual designation signal Sd[m] is a 3-bit digital signal. An example of a relationship between a value indicated by the 3-bit digital signal of the individual designation signal Sd[m] and a designation content is illustrated in FIG. 7 to be described below.

As illustrated in FIG. 6, the drive signal generation unit 4 outputs the drive signal COMa having a pulse PX and a pulse PY. A waveform of the drive signal COMa in the control period Tu1 corresponds to the pulse PX, and a waveform of the drive signal COMa in the control period Tu2 corresponds to the pulse PY.

In the present embodiment, the pulse PX and the pulse PY are defined such that a potential difference between the highest potential VHx and the lowest potential VLx of the pulse PX is more than a potential difference between the highest potential VHy and the lowest potential VLy of the pulse PY. Specifically, when the ejecting portion D[m] is driven by the drive signal COMa having the pulse PX, a waveform of the pulse PX is defined such that a medium amount of ink is ejected from the ejecting portion D[m]. When the ejecting portion D[m] is driven by the drive signal COMa having the pulse PY, a waveform of the pulse PY is defined such that a small amount of ink is ejected from the ejecting portion D[m]. Potentials at a start and an end of the pulse PX and the pulse PY are set to a reference potential V0.

When the individual designation signal Sd[m] designates the ejecting portion D[m] to form a large dot, the coupling state designation circuit 310 sets the coupling state designation signal Qa[m] to a high level in the control periods Tu1 and Tu2, and sets the coupling state designation signals Qb[m] and Qs[m] to a low level in the unit period Tu. In this case, the ejecting portion D[m] is driven by the pulse PX of the drive signal COMa in the control period Tu1 to eject a medium amount of ink, and is driven by the pulse PY of the drive signal COMa in the control period Tu2 to eject a small amount of ink. Therefore, the ejecting portion D[m] ejects a large amount of ink in total in the unit period Tu, and a large dot is formed at the recording paper sheet PP.

When the individual designation signal Sd[m] designates the ejecting portion D[m] to form a medium dot, the coupling state designation circuit 310 respectively sets the coupling state designation signal Qa[m] to a high level in the control period Tu1 and to a low level in the control period Tu2, and sets the coupling state designation signals Qb[m] and Qs[m] to a low level in the unit period Tu. In this case, the ejecting portion D[m] ejects a medium amount of ink in the unit period Tu, and a medium dot is formed at the recording paper sheet PP.

When the individual designation signal Sd[m] designates the ejecting portion D[m] to form a small dot, the coupling state designation circuit 310 respectively sets the coupling state designation signal Qa[m] to a low level in the control period Tu1 and to a high level in the control period Tu2, and sets the coupling state designation signals Qb[m] and Qs[m] to a low level in the unit period Tu. In this case, the ejecting portion D[m] ejects a small amount of ink in the unit period Tu, and a small dot is formed at the recording paper sheet PP.

When the individual designation signal Sd[m] designates the ejecting portion D[m] to perform non-ejection of inks, the coupling state designation circuit 310 sets the coupling state designation signals Qa[m], Qb[m], and Qs[m] to a low level in the unit period Tu. In this case, the ejecting portion D[m] does not eject the inks and thus does not form a dot on the recording paper sheet PP in the unit period Tu.

The drive signal generation unit 4 outputs the drive signal COMb having a pulse PS. A waveform of the drive signal COMb in the unit period Tu corresponds to the pulse PS. In the present embodiment, the pulse PS is defined such that a potential difference between the highest potential VHs and the lowest potential VLs of the pulse PS is less than a potential difference between the highest potential VHy and the lowest potential VLy of the pulse PY. Specifically, when the drive signal COMb having the pulse PS is supplied to the ejecting portion D[m], a waveform of the pulse PS is defined to drive the ejecting portion D[m] to the extent that an ink is not ejected from the ejecting portion D[m]. Potentials at a start and an end of the pulse PS are set to the reference potential V0.

The control unit 2 outputs the period defining signal Tsig having a pulse PlsT1 and a pulse PlsT2. Therefore, the control unit 2 divides the unit period Tu into a control period TSS1 from a start of the pulse PlsL to a start of the pulse PlsT1, a control period TSS2 from a start of the pulse PlsT1 to a start of the pulse PlsT2, and a control period TSS3 from a start of the pulse PlsT2 to a start of the next pulse PlsL.

When the individual designation signal Sd[m] designates the ejecting portion D[m] as the detection target ejecting portion D, the coupling state designation circuit 310 respectively sets the coupling state designation signal Qa[m] to a low level in the unit period Tu and the coupling state designation signal Qb[m] to a high level in the control periods TSS1 and TSS3 and to a low level in the control period TSS2, and respectively sets the coupling state designation signal Qs[m] to a low level in the control periods TSS1 and TSS3 and to a high level in the control period TSS2.

In this case, the detection target ejecting portion D is driven by the pulse PS of the drive signal COMb in the control period TSS1. Specifically, the piezoelectric element PZ included in the detection target ejecting portion D is displaced by the pulse PS of the drive signal COMb in the control period TSS1. As a result, a vibration occurs in the detection target ejecting portion D. The vibration occurring in the control period TSS1 remains in the control period TSS2. In the control period TSS2, a potential of the upper electrode Zu of the piezoelectric element PZ included in the detection target ejecting portion D is changed according to the residual vibration occurring in the detection target ejecting portion D. That is, in the control period TSS2, the potential of the upper electrode Zu of the piezoelectric element PZ included in the detection target ejecting portion D is a potential according to an electromotive force of the piezoelectric element PZ caused by the residual vibration occurring in the detection target ejecting portion D. The potential of the upper electrode Zu is detected as the detection signal Vout in the control period TSS2.

In FIG. 6, a case where the detection signal Vout for detecting whether or not the detection target ejecting portion D has an abnormality, is generated in the printing process period is illustrated. Meanwhile, the detection signal Vout for detecting whether or not the detection target ejecting portion D has the abnormality, may be generated in a period different from the printing process period. That is, a process of detecting whether or not the detection target ejecting portion D has the abnormality may be executed in a period different from the printing process period.

FIG. 7 is an explanatory diagram illustrating generation of the coupling state designation signals Qa[m], Qb[m], and Qs[m] by the coupling state designation circuit 310. As described with reference to FIG. 6, the individual designation signal Sd[m] designates a driving aspect of the ejecting portion D[m] by a value indicated by a 3-bit digital signal.

In the unit period Tu, the individual designation signal Sd[m] indicates any one of a value “1” for designating formation of a large dot, a value “2” for designating formation of a medium dot, a value “3” for designating formation of a small dot, a value “4” for designating non-ejection of inks, and a value “5” for designating driving of the detection target ejecting portion D. When the individual designation signal Sd[m] indicates the value “1”, the coupling state designation circuit 310 sets the coupling state designation signal Qa[m] to a high level in the control periods Tu1 and Tu2. When the individual designation signal Sd[m] indicates the value “2”, the coupling state designation circuit 310 sets the coupling state designation signal Qa[m] to a high level in the control period Tu1. When the individual designation signal Sd[m] indicates the value “3”, the coupling state designation circuit 310 sets the coupling state designation signal Qa[m] to a high level in the control period Tu2. When the individual designation signal Sd[m] indicates the value “5”, the coupling state designation circuit 310 sets the coupling state designation signal Qb[m] to a high level in the control periods TSS1 and TSS3 and sets the coupling state designation signal Qs[m] to a high level in the control period TSS2. When the above conditions are not satisfied, the coupling state designation circuit 310 sets each signal to a low level.

Next, with reference to FIGS. 8 and 9, an operation of the ink jet printer 1 in a storage portion determination period TSu in which a storage portion determination process of determining whether or not the liquid storage portion R has an abnormality will be described.

Figure 8:
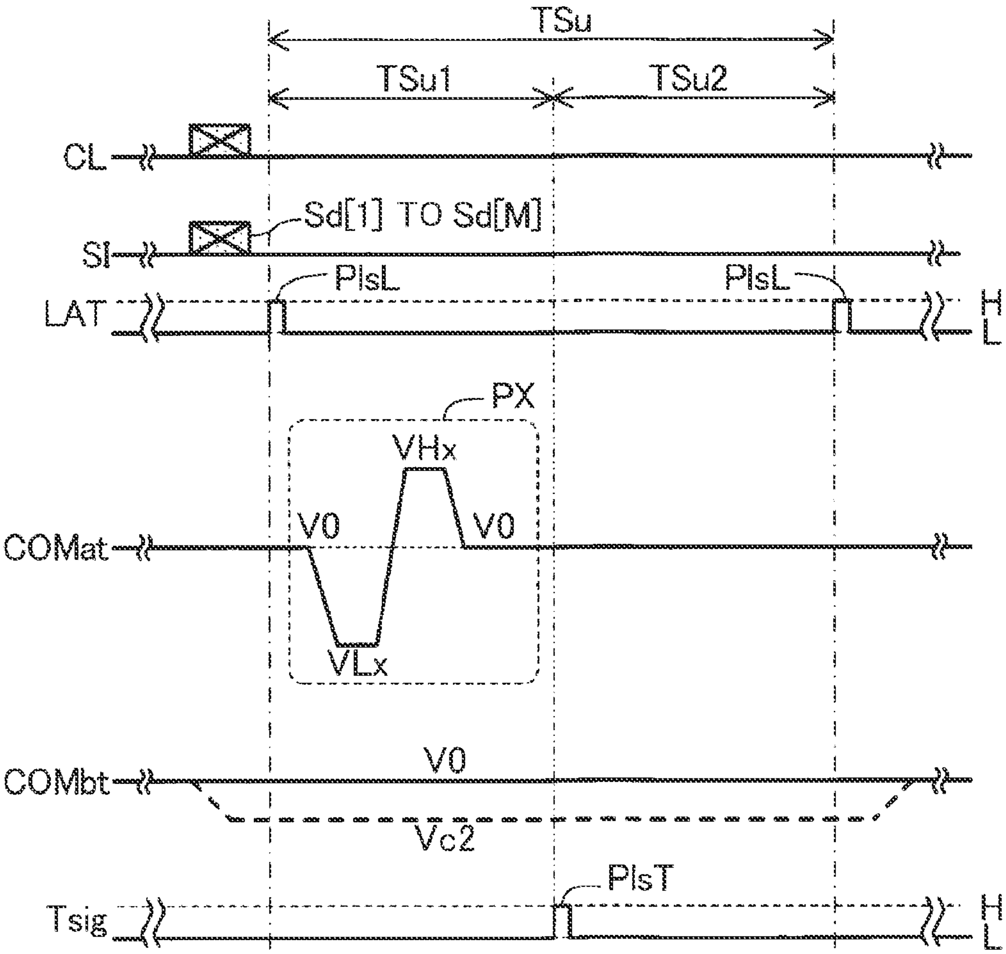
FIG. 8 is a timing chart illustrating an example of an operation of the ink jet printer during a storage portion determination period.

FIG. 8 is a timing chart illustrating an example of the operation of the ink jet printer 1 in the storage portion determination period TSu. In the present embodiment, when the ink jet printer 1 determines whether or not the liquid storage portion R has the abnormality, the storage portion determination period TSu is set as an operation period of the ink jet printer 1. The ink jet printer 1 according to the present embodiment can drive the drive target ejecting portion D to determine whether or not the liquid storage portion R has the abnormality in the storage portion determination period TSu. Further, the ink jet printer 1 according to the present embodiment can detect the detection signal Vout from the detection target ejecting portion D in the storage portion determination period TSu.

The control unit 2 outputs the latch signal LAT having the pulse PlsL and the period defining signal Tsig having a pulse PlsT. Therefore, the control unit 2 defines the storage portion determination period TSu as a period from rising of the pulse PlsL to rising of the next pulse PlsL. In addition, the control unit 2 divides the storage portion determination period TSu into two control periods TSu1 and TSu2, with the pulse PlsT. That is, the storage portion determination process includes the control period TSu1 and the control period TSu2 following the control period TSu1. The storage portion determination process is an example of a “determination process”. The control period TSu1 is an example of a “first period”, and the control period TSu2 is an example of a “second period”.

The printing signal SI includes, for example, the M individual designation signals Sd[1] to Sd[M] corresponding to the M ejecting portions D[1] to D[M] on a one-to-one basis. The individual designation signal Sd[m] designates an aspect of driving of the ejecting portion D[m] in the storage portion determination period TSu when the ink jet printer 1 determines whether or not the liquid storage portion R has an abnormality.

The control unit 2 supplies the printing signal SI including the individual designation signals Sd[1] to Sd[M] to the coupling state designation circuit 310 in synchronization with the clock signal CL before the storage portion determination period TSu in which the storage portion determination process is to be executed. The coupling state designation circuit 310 generates the coupling state designation signals Qa[m], Qb[m], and Qs[m] based on the individual designation signal Sd[m] in the storage portion determination period TSu.

In the present embodiment, a case is assumed in which one of the M ejecting portions D is set as the detection target ejecting portion D in the storage portion determination period TSu, and some or all of the remaining ejecting portions D are set as the drive target ejecting portions D. In FIGS. 8 and 9, in order to facilitate understanding, one of the M ejecting portions D is set as the detection target ejecting portion D in the storage portion determination period TSu, and all the remaining ejecting portions D are set as the drive target ejecting portion D.

For example, the individual designation signal Sd[m] is a signal for designating whether to operate the ejecting portion D[m] as the detection target ejecting portion D or to operate the ejecting portion D[m] as the drive target ejecting portion D in the storage portion determination period TSu. An example of a relationship between a value indicated by the 3-bit digital signal of the individual designation signal Sd[m] and a designation content is illustrated in FIG. 9 to be described below.

As illustrated in FIG. 8, the drive signal generation unit 4 outputs a drive signal COMat having the pulse PX and a drive signal COMbt held at a constant potential, in the storage portion determination period TSu. The pulse PX has the same waveform as the waveform of the pulse PX illustrated in FIG. 6. For example, the pulse PX in the storage portion determination period TSu in which a waveform of the drive signal COMat in the control period TSu1 corresponds to the pulse PX is an example of a "drive pulse" and an "ejection pulse".

The drive signal COMat is held at a constant potential, for example, the reference potential V0 in the control period TSu2. Therefore, in the control period TSu2, a voltage between the upper electrode Zu and the lower electrode Zd of the drive target ejecting portion D is held at a constant voltage. As a result, in the present embodiment, it is possible to reduce superposition of a noise on the potential of the upper electrode Zu of the detection target ejecting portion D in the control period TSu2.

The drive signal COMbt is a signal that holds, for example, a potential of the wiring Lb at the reference potential V0 in the control period TSu1. The potential held constant by the drive signal COMbt is not limited to the reference potential V0. For example, as illustrated by a broken line in FIG. 8, a waveform of the drive signal COMbt may be a waveform such that a potential is displaced to a potential Vc2 before a start of the storage portion determination period TSu, is maintained at the potential Vc2 in the storage portion determination period TSu, and is returned to the reference potential V0 after an end of the storage portion determination period TSu. Alternatively, the waveform of the drive signal COMbt may be a waveform such that a potential is maintained as it is after the potential is displaced from the reference potential V0 to the potential Vc2 in the control period TSu1, is maintained at the potential Vc2 during detection of the detection signal Vout in the control period TSu2, and then returned to the reference potential V0 at a timing that does not affect the detection of the detection signal Vout. In addition, in the example illustrated in FIG. 8, the potential Vc2 is a potential lower than the reference potential V0, and the waveform of the drive signal COMbt may be a waveform held at a potential higher than the reference potential V0 in the storage portion determination period TSu. Hereinafter, it is assumed that the potential held constant by the drive signal COMbt is the reference potential V0.

In FIGS. 8 and 9, a case is assumed in which an i-th ejecting portion D[i] is the detection target ejecting portion D, and ejecting portions D[j] other than the ejecting portion D[i] is the drive target ejecting portion D among the M ejecting portions D. Here, the value i and the value j are values indicated by the variable m. In the present embodiment, the value i is a natural number satisfying "1≤m≤M", and the value j is a value other than the value i among the natural numbers satisfying "1≤m≤M".

When the individual designation signal Sd[j] designates the ejecting portion D[j] to operate as the drive target ejecting portion D, the coupling state designation circuit 310 sets the coupling state designation signal Qa[j] to a high level in the storage portion determination period TSu, and sets the coupling state designation signals Qb[j] and Qs[j] to a low level in the storage portion determination period TSu. In this case, the ejecting portion D[j] is driven by the pulse PX of the drive signal COMat in the control period TSu1. Specifically, the piezoelectric element PZ[j] included in the ejecting portion D[j] is displaced by the pulse PX of the drive signal COMat in the control period TSu1. As a result, a vibration occurs in the ejecting portion D[j], and a medium amount of ink is ejected.

The vibration caused in the drive target ejecting portion D[j] in the control period TSu1 and the ink ejection from the drive target ejecting portion D[j] cause a pressure fluctuation in the liquid storage chamber RS, and the ink stored in the liquid storage chamber RS vibrates. The vibration occurring in the liquid storage chamber RS in the control period TSu1 remains even in the control period TSu2. The vibration of the ink stored in the liquid storage chamber RS causes a vibration in the inspection target ejecting portion D[i]. That is, the vibration corresponding to the residual vibration of the ink stored in the liquid storage chamber RS occurring by driving the drive target ejecting portion D[j] in the control period TSu1 causes the vibration corresponding to the inspection target ejecting portion D[i] in the control period TSu2. An amplitude and a period of the residual vibration of the ink stored in the liquid storage chamber RS are changed depending on whether or not the liquid storage portion R has an abnormality. Therefore, by detecting the vibration occurring in the inspection target ejecting portion D[i], it is possible to determine whether or not the liquid storage portion R has the abnormality.

For example, when the individual designation signal Sd[i] designates the ejecting portion D[i] to operate as the detection target ejecting portion D, the coupling state designation circuit 310 sets the coupling state designation signal Qa[i] to a low level in the storage portion determination period TSu. The coupling state designation circuit 310 respectively sets the coupling state designation signal Qb[i] to a high level in the control period TSu1 and to a low level in the control period TSu2, and respectively sets the coupling state designation signal Qs[i] to a low level in the control period TSu1 and to a high level in the control period TSu2. In this case, the upper electrode Zu[i] of the piezoelectric element PZ[i] included in the ejecting portion D[i] is held at the reference potential V0 in the control period TSu1. That is, a voltage between the upper electrode Zu[i] and the lower electrode Zd[i] of the ejecting portion D[i] is held at a constant voltage in the control period TSu1. The detection signal Vout[i] indicating a potential of the upper electrode Zu[i] of the ejecting portion D[i] is detected as the detection signal Vout in the control period TSu2.

Here, the potential of the upper electrode Zu[i] of the piezoelectric element PZ[i] included in the detection target ejecting portion D[i] is changed in accordance with the vibration occurring in the detection target ejecting portion D[i]. That is, in the control period TSu2, the potential of the upper electrode Zu[i] of the ejecting portion D[i] becomes a potential according to an electromotive force of the piezoelectric element PZ[i] caused by the vibration of the ejecting portion D[i] caused by the residual vibration of the ink stored in the liquid storage chamber RS.

The drive signals COMat and COMbt respectively supplied to the wirings La and Lb in the storage portion determination period TSu are not limited to the example illustrated in FIG. 8. For example, the drive signal COMat may have a plurality of pulses PX supplied to the wiring La in the control period TSu1. Further, one or the plurality of drive pulses supplied to the wiring La in the control period TSu1 are not limited to the pulse PX. For example, the drive signal COMat may have the pulse PY illustrated in FIG. 6 as a drive pulse supplied to the wiring La in the control period TSu1. In this case, the pulse PY is an example of an "ejection pulse". In addition, for example, the drive signal COMat may have a micro-vibration pulse that vibrates the ink in the nozzle N to the extent that the ink in the nozzle N is not ejected, as the drive pulse supplied to the wiring La in the control period TSu1. Even when the drive target ejecting portion D[j] is driven not to eject the ink from the nozzle N[j], the ink stored in the liquid storage chamber RS vibrates as the ink in the ejecting portion D[j] vibrates. Therefore, even when the drive target ejecting portion D[j] is driven to the extent that the ink is not ejected from the nozzle N[j], the vibration caused in the inspection target ejecting portion D[i] is detected, so that it is possible to determine whether or not the liquid storage portion R has the abnormality.

The control unit 2 may hold a voltage between the upper electrode Zu[i] and the lower electrode Zd[i] of the detection target ejecting portion D[i]] at a constant voltage by setting the upper electrode Zu[i] of the detection target ejecting portion D[i] to high impedance in the control period TSu1. Specifically, the control unit 2 may control the coupling state designation circuit 310 such that the coupling state designation signals Qa[i], Qb[i], and Qs[i] for designating an aspect of driving of the detection target ejecting portion D[i] is set to a low level in the control period TSu1.

FIG. 9 is an explanatory diagram illustrating generation of the coupling state designation signals Qa[m], Qb[m], and Qs[m] by the coupling state designation circuit 310. As described with reference to FIG. 8, the individual designation signal Sd[m] designates a driving aspect of the ejecting portion D[m] by a value indicated by a 3-bit digital signal. FIG. 9 illustrates the coupling state designation signals Qa[m], Qb[m], and Qs[m] when a value of the variable m is the value i and the value j as described in FIG. 8.

The individual designation signal Sd[m] indicates any one of a value "6" for designating an operation as the detection target ejecting portion D and a value "7" for designating an operation as the drive target ejecting portion D in the storage portion determination period TSu. When the individual designation signal Sd[m] indicates the value "6", the coupling state designation circuit 310 sets the coupling state designation signal Qb[m] to a high level in the control period TSu1, and sets the coupling state designation signal Qs[m] to a high level in the control period TSu2. When the individual designation signal Sd[m] indicates the value "7", the coupling state designation circuit 310 sets the coupling state designation signal Qa[m] to a high level in the control periods TSu1 and TSu2. When the above conditions are not satisfied, the coupling state designation circuit 310 sets each signal to a low level.

FIG. 10 is a diagram schematically illustrating a form of a droplet DR ejected from the nozzle N when the liquid storage portion R has an abnormality. FIG. 10 schematically illustrates a form of droplets DR during flying when the droplets DR are continuously ejected from the plurality of nozzles N at the same time in a state where the liquid storage portion R has an abnormality.

As illustrated in FIG. 10, when the liquid storage portion R has an abnormality, ejection velocities of the first droplets DR are aligned at the plurality of nozzles N, and the ejection velocities of the second droplets DR are disturbed due to the influence of a pressure fluctuation occurring in the liquid storage chamber RS due to the ejection of the first droplet DR. In a method of determining whether or not the ejecting portion D has an abnormality by driving the inspection target ejecting portion D and detecting a residual vibration of the inspection target ejecting portion D, a fluctuation in ejection velocity of the second droplet DR due to the abnormality in the liquid storage portion R is not detected, so that the inspection target ejecting portion D is determined to be normal. When printing is executed based on the determination result, there is a possibility that printing unevenness occurs due to the fluctuation in ejection velocity of the droplet DR.

On the other hand, in the present embodiment, as described with reference to FIG. 8 and the like, the storage portion determination process of determining whether or not the liquid storage portion R has the abnormality is executed during the storage portion determination period TSu including the control periods TSu1 and TSu2. For example, the control unit 2 drives the drive target ejecting portion D[j] in a state in which a voltage between the upper electrode Zu[i] and the lower electrode Zd[i] of the inspection target ejecting portion D[i] is held at a constant voltage in the control period TSu1. The detection circuit 32 detects the detection signal Vout[i] indicating a potential of the upper electrode Zu[i] of the ejecting portion D[i], as information indicating a residual vibration of the ink in the pressure chamber CV of the inspection target ejecting portion D[i] in the control period TSu2 following the control period TSu1. Therefore, the determination unit 6 determines whether or not the liquid storage portion R has the abnormality based on the detection signal Vout[i] indicating the vibration occurring in the inspection target ejecting portion D[i] in the control period TSu2. Therefore, in the present embodiment, by determining whether or not to execute printing based on the determination result of the storage portion determination process, it is possible to reduce the occurrence of printing unevenness due to the fluctuation in ejection velocity of the droplet DR.

Figure 11:
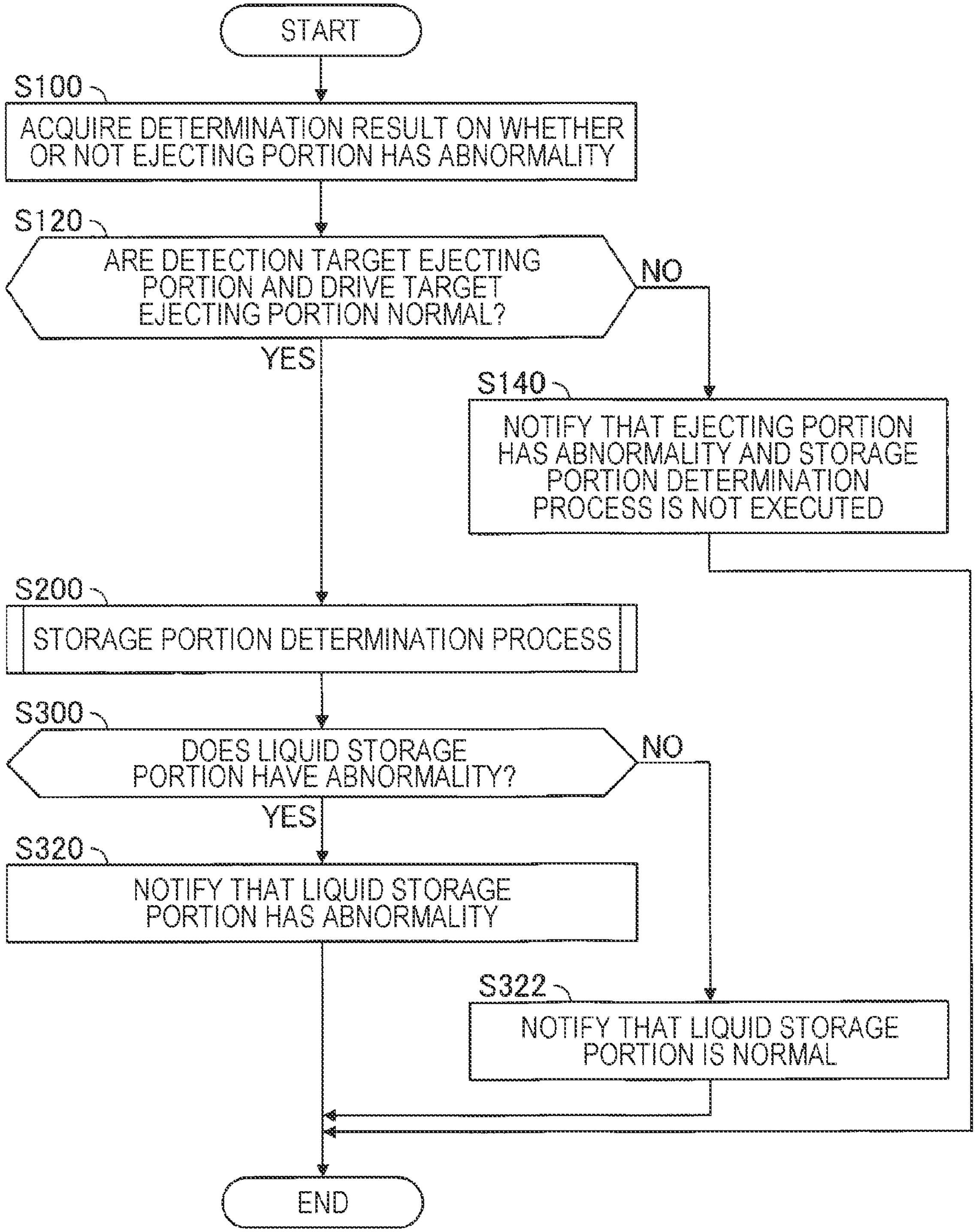
FIG. 11 is a flowchart illustrating an example of an operation of the ink jet printer when determining whether or not the liquid storage portion has the abnormality.

FIG. 11 is a flowchart illustrating an example of an operation of the ink jet printer 1 when determining whether or not the liquid storage portion R has an abnormality. In the operations illustrated in FIGS. 11 and 12, a case is assumed in which the detection target ejecting portion D and the drive target ejecting portion D are determined in advance, and reference information indicating a reference value corresponding to the predetermined detection target ejecting portion D and drive target ejecting portion D is stored in the storage unit 5.

First, in step S100, the control unit 2 acquires a determination result on whether or not the ejecting portion D has an abnormality. For example, when the determination result information Rinf indicating a result of the determination on whether or not the ejecting portion D has the abnormality, which is executed during a printing process period by the drive signal COMb or the like illustrated in FIG. 6, is stored in the storage unit 5, the control unit 2 acquires the determination result information Rinf from the storage unit 5. Alternatively, the control unit 2 may control the drive signal generation unit 4 and the like to detect a residual vibration of each of the predetermined detection target ejecting portion D and drive target ejecting portion D again, and acquire the determination result information Rinf from the determination unit 6 based on this detection result.

Next, in step S120, the control unit 2 determines whether or not all of the predetermined detection target ejecting portion D and drive target ejecting portion D are normal.

When a result of the determination in step S120 is negative, in step S140, the control unit 2 notifies that the ejecting portion D has an abnormality and a storage portion determination process is not executed, and ends the operation illustrated in FIG. 11.

On the other hand, when the result of the determination in step S120 is positive, the control unit 2 shifts the process to step S200.

In step S200, the control unit 2 executes the storage portion determination process. With the storage portion determination process, whether or not the liquid storage portion R has an abnormality is determined. Details of the storage portion determination process will be described below in FIG. 12. After executing the storage portion determination process, the control unit 2 shifts the process to step S300.

In step S300, the control unit 2 determines whether or not the liquid storage portion R has an abnormality based on a result of the storage portion determination process.

When the result of the determination in step S300 is positive, the control unit 2 notifies that the liquid storage portion R has an abnormality in step S320, and ends the operation illustrated in FIG. 11.

On the other hand, when the result of the determination in step S300 is negative, the control unit 2 notifies that the liquid storage portion R is normal in step S322, and ends the operation illustrated in FIG. 11.

In the operation illustrated in FIG. 11, when either the predetermined detection target ejecting portion D or drive target ejecting portion D is abnormal, the storage portion determination process is not executed, and thus erroneous detection of an abnormality in the liquid storage portion R can be reduced.

Figure 12:
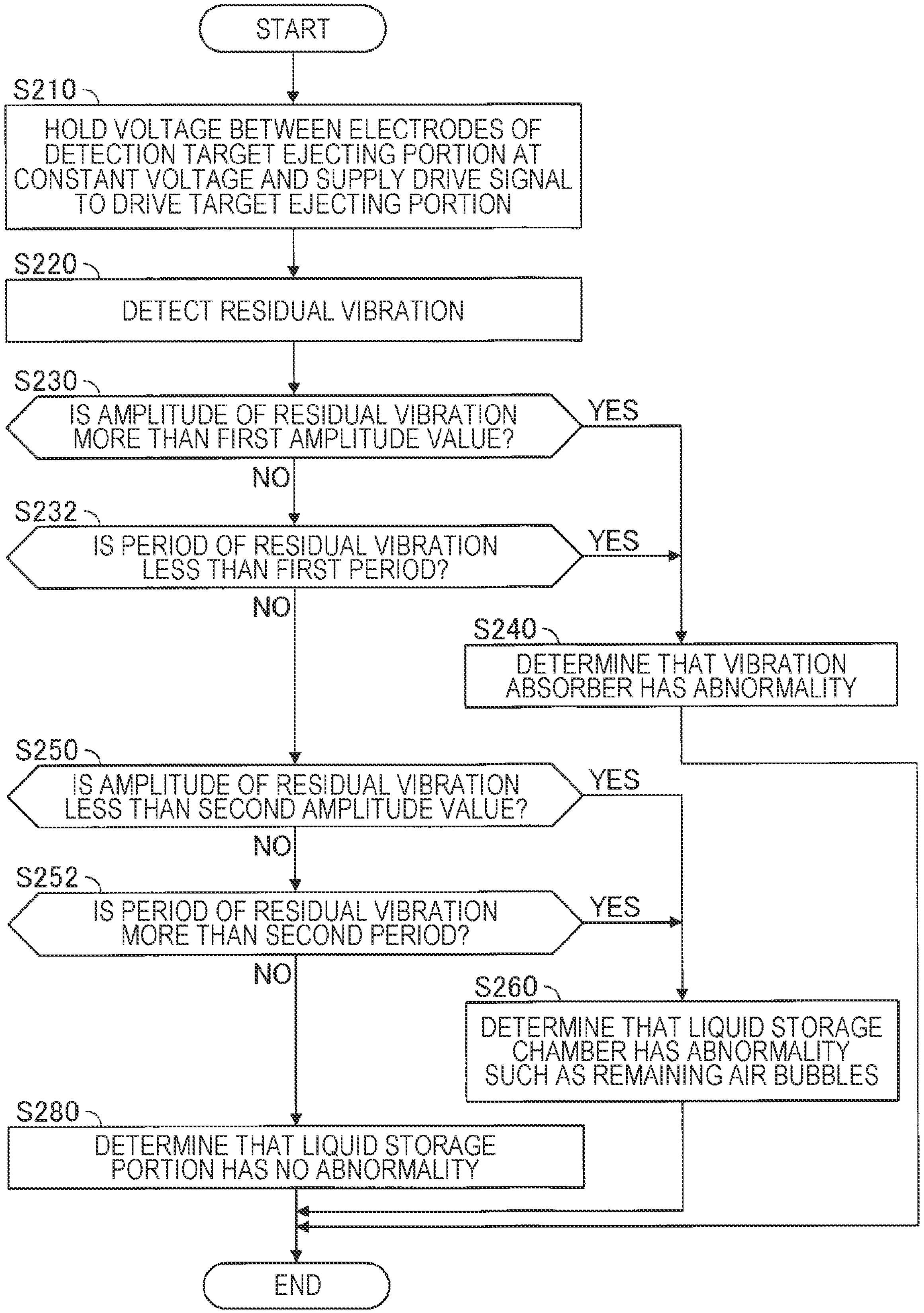
FIG. 12 is a flowchart illustrating an example of a storage portion determination process.

FIG. 12 is a flowchart illustrating an example of the storage portion determination process. The flow illustrated in FIG. 12 is a flow of the storage portion determination process in step S200 illustrated in FIG. 11. For example, the process in step S210 illustrated in FIG. 12 is executed when the result of determination in step S120 illustrated in FIG. 11 is positive. Further, for example, ending of the storage portion determination process illustrated in FIG. 12 means that the process proceeds to step S300 illustrated in FIG. 11.

In the present embodiment, a case is assumed in which a reference value corresponding to the predetermined detection target ejecting portion D and drive target ejecting portion D includes a reference amplitude value and a reference period. Further, in the present embodiment, the reference amplitude value includes a first amplitude value and a second amplitude value equal to or less than the first amplitude value, and the reference period includes a first period and a second period equal to or more than the first period. A case is assumed in which the first amplitude value, the second amplitude value equal to or less than the first amplitude value, the first period, and the second period equal to or more than the first period are included. The second amplitude value may be the same value as the first amplitude value or may be a value less than the first amplitude value. In the same manner, the second period may be the same period as the first period or may be a period more than the first period.

The first amplitude value, the second amplitude value, the first period, and the second period as the reference values are determined based on, for example, a reference residual vibration measured in advance by using the predetermined detection target ejecting portion D and drive target ejecting portion D. The first amplitude value, the second amplitude value, the first period, and the second period as the reference values may be determined based on a reference residual vibration obtained by a simulation using the predetermined detection target ejecting portion D and drive target ejecting portion D. Further, a comparison between the reference value including the first amplitude value, the second amplitude value, the first period, and the second period and a value based on the detection signal Vout corresponds to a comparison between the reference residual vibration and a residual vibration of inks in the pressure chamber CV of the detection target ejecting portion D.

First, in step S210, the control unit 2 controls the drive signal generation unit 4 and the like such that the drive signal COMat is supplied to the drive target ejecting portion D in a state where a voltage between the upper electrode Zu and the lower electrode Zd of the inspection target ejecting portion D is held at a constant voltage. For example, the control unit 2 controls the drive signal generation unit 4, the switching circuit 31, and the detection circuit 32 such that the drive signals COMat and COMbt are respectively supplied to the drive target ejecting portion D and the inspection target ejecting portion D in the control period TSu1 to output the detection signal Vout of the inspection target ejecting portion D in the control period TSu2.

Next, in step S220, the detection circuit 32 detects the detection signal Vout indicating a potential of the upper electrode Zu of the ejecting portion D as information indicating the residual vibration of the ink in the pressure chamber CV of the inspection target ejecting portion D, and outputs the detected detection signal Vout to the determination unit 6.

Next, in step S230, the determination unit 6 determines whether or not an amplitude of the residual vibration is more than the first amplitude value, based on the detection signal Vout.

When a result of the determination in step S230 is positive, the determination unit 6 determines that the vibration absorber 39 has an abnormality in step S240, transmits the determination result information Rinf indicating the determination result to the control unit 2, and ends the storage portion determination process illustrated in FIG. 12.

On the other hand, when the result of the determination in step S230 is negative, the determination unit 6 shifts the process to step S232.

In step S232, the determination unit 6 determines whether or not a period of the residual vibration is less than the first period, based on the detection signal Vout.

When a result of the determination in step S232 is positive, the determination unit 6 determines that the vibration absorber 39 has an abnormality in step S240, transmits the determination result information Rinf indicating the determination result to the control unit 2, and ends the storage portion determination process illustrated in FIG. 12.

On the other hand, when the result of the determination in step S232 is negative, the determination unit 6 shifts the process to step S250.

In step S250, the determination unit 6 determines whether or not the amplitude of the residual vibration is less than the second amplitude value based on the detection signal Vout.

When a result of the determination in step S250 is positive, the determination unit 6 determines that there is an abnormality in the liquid storage chamber RS such as remaining air bubbles in step S260, transmits the determination result information Rinf indicating the determination result to the control unit 2, and ends the storage portion determination process illustrated in FIG. 12.

On the other hand, when the result of the determination in step S250 is negative, the determination unit 6 shifts the process to step S252.

In step S252, the determination unit 6 determines whether or not a period of the residual vibration is more than the second period, based on the detection signal Vout.

When a result of the determination in step S252 is positive, the determination unit 6 determines that there is an abnormality in the liquid storage chamber RS such as remaining air bubbles in step S260, transmits the determination result information Rinf indicating the determination result to the control unit 2, and ends the storage portion determination process illustrated in FIG. 12.

On the other hand, when the result of the determination in step S252 is negative, in step S280, the determination unit 6 determines that there is no abnormality in the liquid storage portion R, transmits the determination result information Rinf indicating the determination result to the control unit 2, and ends the storage portion determination process illustrated in FIG. 12.

The operation of the ink jet printer 1 when determining whether or not the liquid storage portion R has the abnormality is not limited to the examples illustrated in FIGS. 11 and 12. For example, a series of processes in steps S100, S120, and S140 illustrated in FIG. 11 may be omitted. In this case as well, when the liquid storage portion R or the ejecting portion D has an abnormality, the abnormality is detected by the storage portion determination process as an abnormality in the head unit 3. In addition, a series of processes in steps S250, S252, and S260 illustrated in FIG. 12 may be executed before a series of processes in steps S230, S232, and S240. Further, one of the series of processes in steps S230, S232, and S240 and the series of processes in steps S250, S252, and S260 illustrated in FIG. 12 may be omitted. In this case as well, it is possible to detect one of an abnormality of the vibration absorber 39 and an abnormality such as remaining air bubbles in the liquid storage chamber RS.

As described above, the abnormality determination method of the head unit 3 according to the present embodiment is an abnormality determination method of the head unit 3 including the nozzle N that ejects an ink, the pressure chamber CV that communicates with the nozzle N, the upper electrode Zu, the lower electrode Zd, the plurality of ejecting portions D including the piezoelectric body Zm disposed between the upper electrode Zu and the lower electrode Zd and driven to apply a pressure fluctuation to the ink in the pressure chambers CV, and the liquid storage portion R that communicates with the pressure chamber CV of each of the plurality of ejecting portions D via the supply flow path 334 and stores the ink. In the control period TSu1, a voltage between the upper electrode Zu and the lower electrode Zd of the detection target ejecting portion D among the plurality of ejecting portions D is held at a constant voltage, in the control period TSu1, the drive signal COMat including a drive pulse for applying the pressure fluctuation to the ink in the pressure chamber CV of the drive target ejecting portion D is supplied to one of the upper electrode Zu and the lower electrode Zd of the drive target ejecting portion D different from the detection target ejecting portion D among the plurality of ejecting portions D, and in the control period TSu2 following the control period TSu1, a residual vibration, which is a vibration of the ink in the pressure chamber CV of the detection target ejecting portion D, is detected to determine whether or not the head unit 3 has an abnormality based on the residual vibration.

In this manner, in the present embodiment, in the control period TSu1, in a state where the voltage between the upper electrode Zu and the lower electrode Zd of the inspection target ejecting portion D is held at a constant voltage, the drive target ejecting portion D is driven by the drive signal COMat. After the drive target ejecting portion D is driven, a residual vibration of the inspection target ejecting portion D caused by the residual vibration remaining in the liquid storage portion R is detected in the control period TSu2. Then, it is determined whether or not the head unit 3 has an abnormality based on the residual vibration of the inspection target ejecting portion D. Therefore, in the present embodiment, it is possible to determine whether or not the liquid storage portion R has the abnormality, which is difficult to detect only in determination on whether or not the ejecting portion D has an abnormality.

That is, in the present embodiment, as whether or not the head unit 3 has an abnormality, whether or not the liquid storage portion R has an abnormality is determined based on the residual vibration. The abnormality of the liquid storage portion R is considered to be a cause that causes a phenomenon in which the velocities of the subsequent droplets are disturbed, for example, when the droplets are ejected continuously from the plurality of nozzles N at the same time. Therefore, in the present embodiment, it is possible to detect whether or not the head unit 3 has an abnormality that causes the phenomenon in which the velocities of the subsequent droplets are disturbed when the droplets are ejected continuously from the plurality of nozzles N at the same time.

In the present embodiment, the pulse PX or PY for ejecting droplets from the nozzle N is supplied as a drive pulse to one of the upper electrode Zu and the lower electrode Zd of the drive target ejecting portion D in the control period TSu1. Therefore, in the present embodiment, it is possible to increase the pressure fluctuation of the ink stored in the liquid storage portion R, which occurs by driving the drive target ejecting portion D. As a result, in the present embodiment, in the control period TSu2, it is possible to easily detect a residual vibration of the inspection target ejecting portion D caused by the residual vibration of the liquid storage portion R.

In the present embodiment, the voltage between the upper electrode Zu and the lower electrode Zd of the drive target ejecting portion D is held at a constant voltage in the control period TSu2. Therefore, in the present embodiment, it is possible to reduce superposition of a noise on the potential of the upper electrode Zu of the detection target ejecting portion D in the control period TSu2. As a result, in the present embodiment, the residual vibration of the inspection target ejecting portion D can be accurately detected.

In the present embodiment, the drive signal COMat may include a plurality of drive pulses that apply pressure fluctuations to the inks in the pressure chamber CV of the drive target ejecting portion D in the control period TSu1. For example, the number of drive pulses included in the drive signal COMat may be determined such that a magnitude of the pressure fluctuation of the ink stored in the liquid storage portion R, which occurs by the driving of the drive target ejecting portion D, becomes an appropriate magnitude. In this case, in the control period TSu2, it is possible to easily detect the residual vibration of the inspection target ejecting portion D caused by the residual vibration of the liquid storage portion R.

Further, in the present embodiment, whether or not the head unit 3 has an abnormality is determined based on a comparison result between the predetermined reference residual vibration and the residual vibration detected in the control period TSu2. In this manner, in the present embodiment, information based on the predetermined reference residual vibration is used for determining whether or not the head unit 3 has the abnormality. Therefore, in the present embodiment, it is possible to easily execute determination on whether or not the head unit 3 has the abnormality.

In the present embodiment, whether or not there is an abnormality is determined in each of the detection target ejecting portion D and the drive target ejecting portion D before the control period TSu1, and when the detection target ejecting portion D and the drive target ejecting portion D are determined to be normal, determination on whether or not the head unit 3 has an abnormality is executed based on the residual vibration. Therefore, in the present embodiment, it is possible to reduce erroneous detection of the abnormality of the liquid storage portion R.

Further, in the present embodiment, whether or not the head unit 3 has the abnormality is determined based on the comparison result between the reference amplitude value indicated by the reference information prepared in advance and an amplitude value of the residual vibration detected in the control period TSu2. Therefore, in the present embodiment, it is possible to easily determine the abnormality of the liquid storage portion R.

Further, in the present embodiment, the liquid storage portion R includes the vibration absorber 39 that absorbs the vibration of the stored ink, the reference amplitude value includes the first amplitude value, and when the amplitude value of the residual vibration detected in the control period TSu2 is more than the first amplitude value, it is determined that the vibration absorber 39 has an abnormality. In this manner, in the present embodiment, based on the amplitude value of the residual vibration detected in the control period TSu2 and the first amplitude value prepared in advance, it is possible to easily determine whether or not the vibration absorber 39 has the abnormality.

In addition, in the present embodiment, the reference amplitude value includes the second amplitude value, and when the amplitude value of the residual vibration detected in the control period TSu2 is less than the second amplitude value, it is determined that there are air bubbles in the liquid storage portion R. In this manner, in the present embodiment, whether or not air bubbles exist in the liquid storage portion R can be easily determined based on the amplitude value of the residual vibration detected in the control period TSu2 and the second amplitude value prepared in advance.

Further, in the present embodiment, whether or not the head unit 3 has the abnormality is determined based on the comparison result between the reference period indicated by the reference information prepared in advance and a period of the residual vibration detected in the control period TSu2. Therefore, in the present embodiment, it is possible to easily determine the abnormality of the liquid storage portion R.

Further, in the present embodiment, the liquid storage portion R includes the vibration absorber 39 that absorbs the vibration of the stored ink, the reference period includes the first period, and when the period of the residual vibration detected in the control period TSu2 is less than the first period, it is determined that the vibration absorber 39 has an abnormality. In this manner, in the present embodiment, based on the period of the residual vibration detected in the control period TSu2 and the first period prepared in advance, it is possible to easily determine whether or not the vibration absorber 39 has the abnormality.

In addition, in the present embodiment, when the reference period includes the second period and the amplitude value of the residual vibration detected in the control period TSu2 is more than the second period, it is possible to determine whether or not air bubbles exist in the liquid storage portion R based on the period of the residual vibration detected in the control period TSu2 and the second period prepared in advance.

Further, in the present embodiment, based on the comparison result between the reference amplitude value indicated by the reference information prepared in advance and the amplitude value of the residual vibration detected in the control period TSu2, and the comparison result between the reference period indicated by the reference information and the period of the residual vibration detected in the control period TSu2, whether or not the head unit 3 has an abnormality is determined. In this manner, in the present embodiment, whether or not the head unit 3 has the abnormality is determined by using two types of information, that is, the amplitude and the period. Therefore, in the present embodiment, it is possible to reduce a case in which the abnormality of the liquid storage portion R is not detected.

For example, in the present embodiment, when at least one of a case where the amplitude value of the residual vibration detected in the control period TSu2 is more than the first amplitude value and a case where the period of the residual vibration detected in the control period TSu2 is less than the first period is satisfied, it is determined that the vibration absorber 39 has an abnormality. In this case, it is possible to reduce a case in which the abnormality of the vibration absorber 39 is not detected.

In addition, for example, in the present embodiment, when at least one of a case where the amplitude value of the residual vibration detected in the control period TSu2 is less than the second amplitude value and a case where the period of the residual vibration detected in the control period TSu2 is more than the second period is satisfied, it is determined that air bubbles exist in the liquid storage portion R. In this case, it is possible to reduce a case in which an abnormality in which air bubbles exist in the liquid storage portion R is not detected.

In the present embodiment, the reference residual vibration is a residual vibration measured in advance. For example, the reference amplitude value is determined based on an amplitude value of the reference residual vibration measured in advance. Further, for example, the reference period is determined based on a period of the reference residual vibration measured in advance. The detection target ejecting portion D in the control period TSu1 and the control period TSu2 is the ejecting portion D at the same position as the detection target ejecting portion D when the reference residual vibration is measured. The drive target ejecting portion D in the control period TSu1 and the control period TSu2 is the ejecting portion D at the same position as the drive target ejecting portion D when the reference residual vibration is measured. In this manner, in the present embodiment, the detection target ejecting portion D and the drive target ejecting portion D when the residual vibration is detected to determine whether or not the head unit 3 has an abnormality, and the detection target ejecting portion D and the drive target ejecting portion D when the reference residual vibration are measured are provided. Therefore, in the present embodiment, it is possible to accurately determine whether or not the head unit 3 has the abnormality.

Further, in the present embodiment, the ink jet printer 1 includes the head unit 3, the determination unit 6 that determines whether or not the head unit 3 has an abnormality, and the control unit 2 that controls the head unit 3 and the determination unit 6. The head unit 3 includes the nozzle N that ejects an ink, the pressure chamber CV that communicates with the nozzle N, the upper electrode Zu, the lower electrode Zd, the plurality of ejecting portions D including the piezoelectric body Zm disposed between the upper electrode Zu and the lower electrode Zd and driven to apply a pressure fluctuation to the ink in the pressure chambers CV, and the liquid storage portion R that communicates with the pressure chamber CV of each of the plurality of ejecting portions D via the supply flow path 334 and stores the ink. When the control unit 2 controls the head unit 3, in the control period TSu1, a voltage between the upper electrode Zu and the lower electrode Zd of the detection target ejecting portion D among the plurality of ejecting portions D is held at a constant voltage, in the control period TSu1, the drive signal COMat including a drive pulse for applying the pressure fluctuation to the ink in the pressure chamber CV of the drive target ejecting portion D is supplied to one of the upper electrode Zu and the lower electrode Zd of the drive target ejecting portion D different from the detection target ejecting portion D among the plurality of ejecting portions D, and in the control period TSu2 following the control period TSu1, a residual vibration, which is a vibration of the ink in the pressure chamber CV of the detection target ejecting portion D, is detected. The determination unit 6 determines whether or not the head unit 3 has an abnormality based on the residual vibration.

In this manner, in the present embodiment, the determination unit 6 determines whether or not the head unit 3 has an abnormality based on a residual vibration of the inspection target ejecting portion D caused by the residual vibration remaining in the liquid storage portion R after the drive target ejecting portion D is driven. Therefore, in the present embodiment, it is possible to determine whether or not the liquid storage portion R has the abnormality, which is difficult to detect only in determination on whether or not the ejecting portion D has an abnormality.

2. Modification Example

Each embodiment above can be variously modified. A specific aspect of the modification will be described below. Two or more aspects selected in any manner from the following examples can be appropriately combined with each other within a range not inconsistent with each other. In addition, in the modification examples described below, elements having the same effects and functions as those of the embodiment will be given the reference numerals used in the description above, and each detailed description thereof will be appropriately omitted.

First Modification Example

In the embodiment described above, a plurality of combination patterns of the detection target ejecting portion D and the drive target ejecting portion D may be set in advance, and reference information indicating a plurality of reference values corresponding to the plurality of combination patterns may be stored in advance in the storage unit 5.

Figure 13:
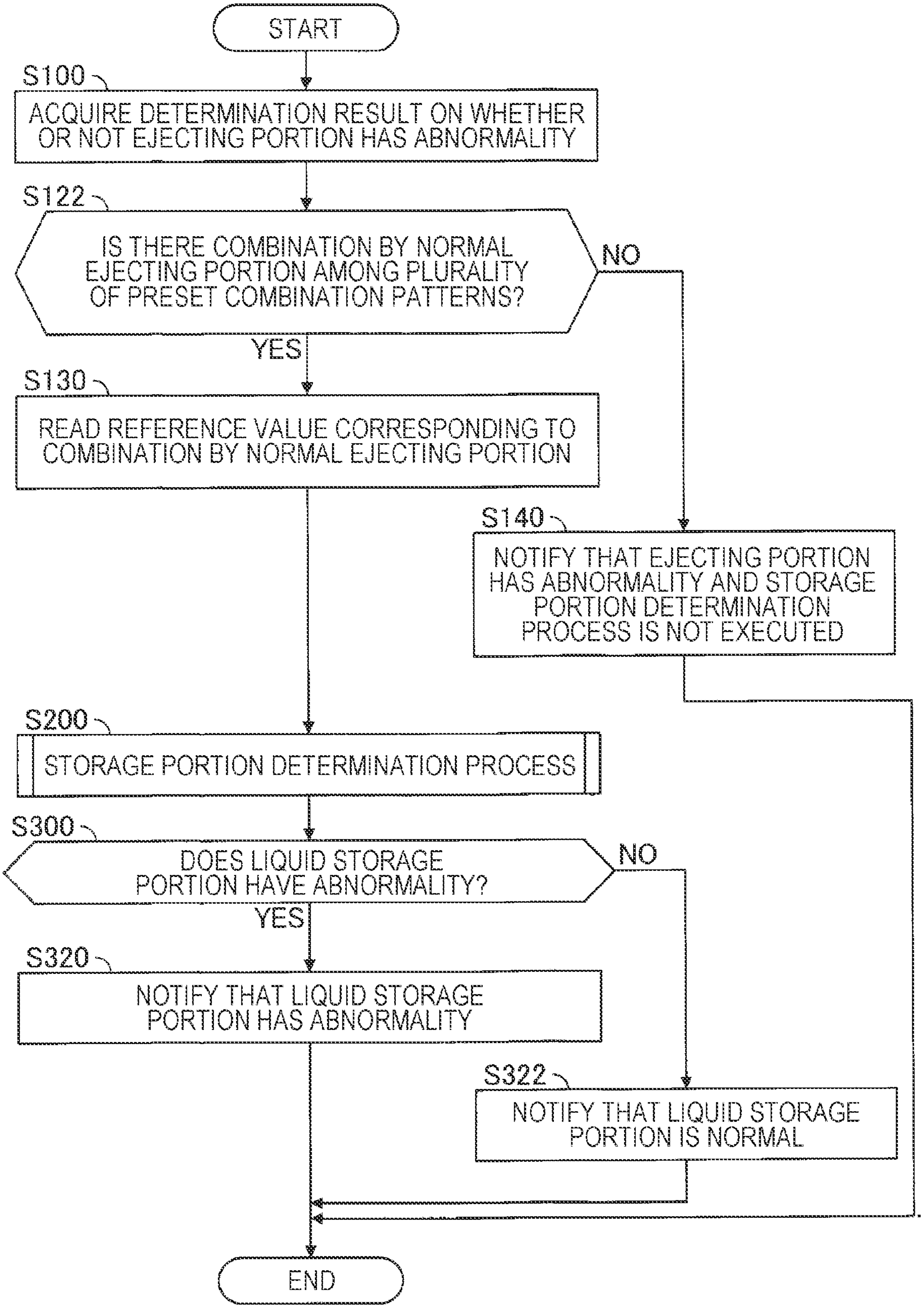
FIG. 13 is a flowchart illustrating an example of an operation of an ink jet printer according to a first modification example.

FIG. 13 is a flowchart illustrating an example of an operation of the ink jet printer 1 according to a first modification example. FIG. 13 illustrates an operation flow of the ink jet printer 1 when determining whether or not the liquid storage portion R has an abnormality. Detailed descriptions of a process having the same manner as the process described with reference to FIG. 11 and FIG. 12 will be omitted. An operation illustrated in FIG. 13 has the same manner as the operation illustrated in FIG. 11, except that a process in step S122 is executed instead of the process in step S120 illustrated in FIG. 11, and a process in step S130 is executed before a storage portion determination process in step S200 is executed.

In the operation illustrated in FIG. 13, as described above, a case is assumed in which a plurality of combination patterns of the detection target ejecting portion D and the drive target ejecting portion D are set in advance, and reference information indicating a plurality of reference values corresponding to the plurality of combination patterns are stored in advance in the storage unit 5.

In the present modification example, a case is assumed in which in each of the plurality of combination patterns, one of the M ejecting portions D is set as the detection target ejecting portion D, and some of the remaining ejecting portions D are set as the drive target ejecting portion D. That is, in the present modification example, in each of the plurality of combination patterns, there is an ejecting portion D that is neither the detection target ejecting portion D nor the drive target ejecting portion D among the M ejecting portions D. For example, a voltage between the upper electrode Zu and the lower electrode Zd of the ejecting portion D that is neither the detection target ejecting portion D nor the drive target ejecting portion D is held at a constant voltage in the storage portion determination period TSu. Alternatively, the upper electrode Zu of the ejecting portion D that is neither the detection target ejecting portion D nor the drive target ejecting portion D is set to high impedance in the storage portion determination period TSu.

One of the plurality of combination patterns may be, for example, a reference pattern in which an odd-numbered ejecting portion D is set as the drive target ejecting portion D and any one of even-numbered ejecting portions D is set as the detection target ejecting portion D. In addition, another one of the plurality of combination patterns may be, for example, a reference pattern in which an even-numbered ejecting portion D is set as the drive target ejecting portion D and any one of odd-numbered ejecting portions D is set as the detection target ejecting portion D. The plurality of combination patterns are not limited to the example described above. For example, the plurality of combination patterns may include a reference pattern in which a plurality of ejecting portions D located near a center of the head unit 3 are set as the drive target ejecting portions D, a reference pattern in which a plurality of ejecting portions D located near an end portion of the head unit 3 are set as the drive target ejecting portions D, and the like.

After executing the process in step S100, the control unit 2 shifts the process to step S122.

In step S122, the control unit 2 determines whether or not there is a combination by a normal ejecting portion D in the plurality of preset combination patterns of the detection target ejecting portion D and the drive target ejecting portion D.

When a result of the determination in step S122 is negative, in step S140, the control unit 2 notifies that the ejecting portion D has an abnormality and a storage portion determination process is not executed, and ends the operation illustrated in FIG. 13.

On the other hand, when a result of the determination in step S122 is positive, the control unit 2 shifts the process to step S130.

In step S130, the control unit 2 reads reference information indicating a reference value corresponding to the combination by the normal ejecting portion D from the storage unit 5. When there are a plurality of combinations by the normal ejecting portion D among the plurality of preset combination patterns, the control unit 2 selects any one combination from the plurality of combinations by the normal ejecting portion D. The control unit 2 reads reference information indicating a reference value corresponding to the combination selected from the plurality of combinations by the normal ejecting portion D, from the storage unit 5.

After executing the process in step S130, the control unit 2 shifts the process to step S200. A storage portion determination process in step S200 is the same as the storage portion determination process illustrated in FIG. 12.

In the present modification example, with a series of the processes in step S122 and step S130, when the abnormal ejecting portion D also exists among the M ejecting portions D, it is possible to increase a frequency with which the storage portion determination process using the normal ejecting portion D is executed. As a result, in the present modification example, it is possible to reduce a case in which the abnormality of the liquid storage portion R is not detected.

As described above, in the present modification example, whether or not each of the plurality of ejecting portions D has an abnormality is determined before the control period TSu1, and the detection target ejecting portion D and the drive target ejecting portion D are set from the ejecting portions D determined to be normal among the plurality of ejecting portions D. In the present modification example as well, the same effect as the effect of the embodiment described above can be obtained. Further, in the present modification example, even when the ejecting portion D having an abnormality exists among the M ejecting portions D, it is possible to increase a frequency with which the storage portion determination process using the normal ejecting portion D is executed, so that it is possible to reduce a case in which the abnormality of the liquid storage portion R is not detected.

Second Modification Example

In the embodiment and modification example described above, the storage portion determination process may be executed a plurality of times by using the plurality of combinations of the detection target ejecting portion D and the drive target ejecting portion D.

Figure 14:
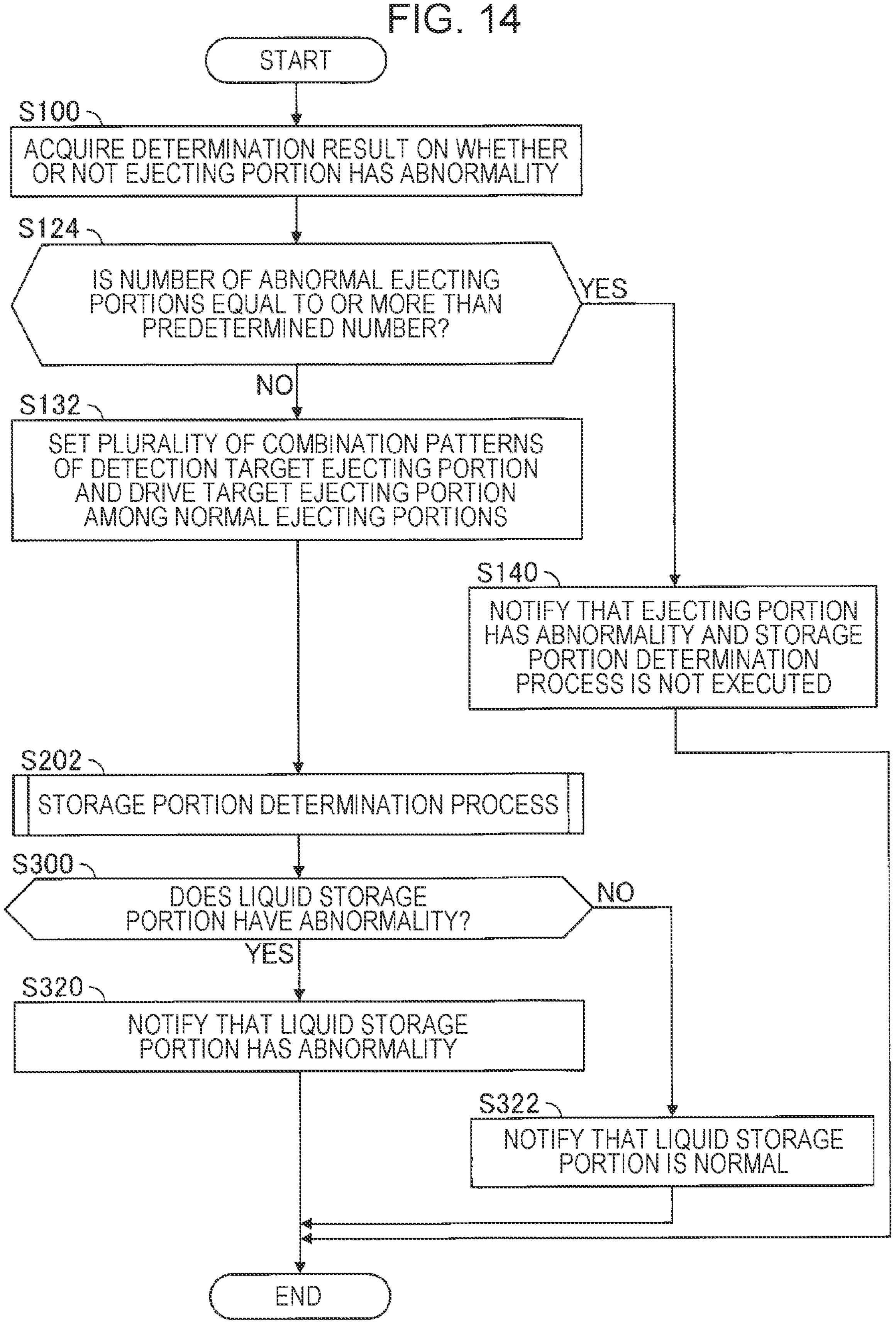
FIG. 14 is a flowchart illustrating an example of an operation of an ink jet printer according to a second modification example.
Figure 15:
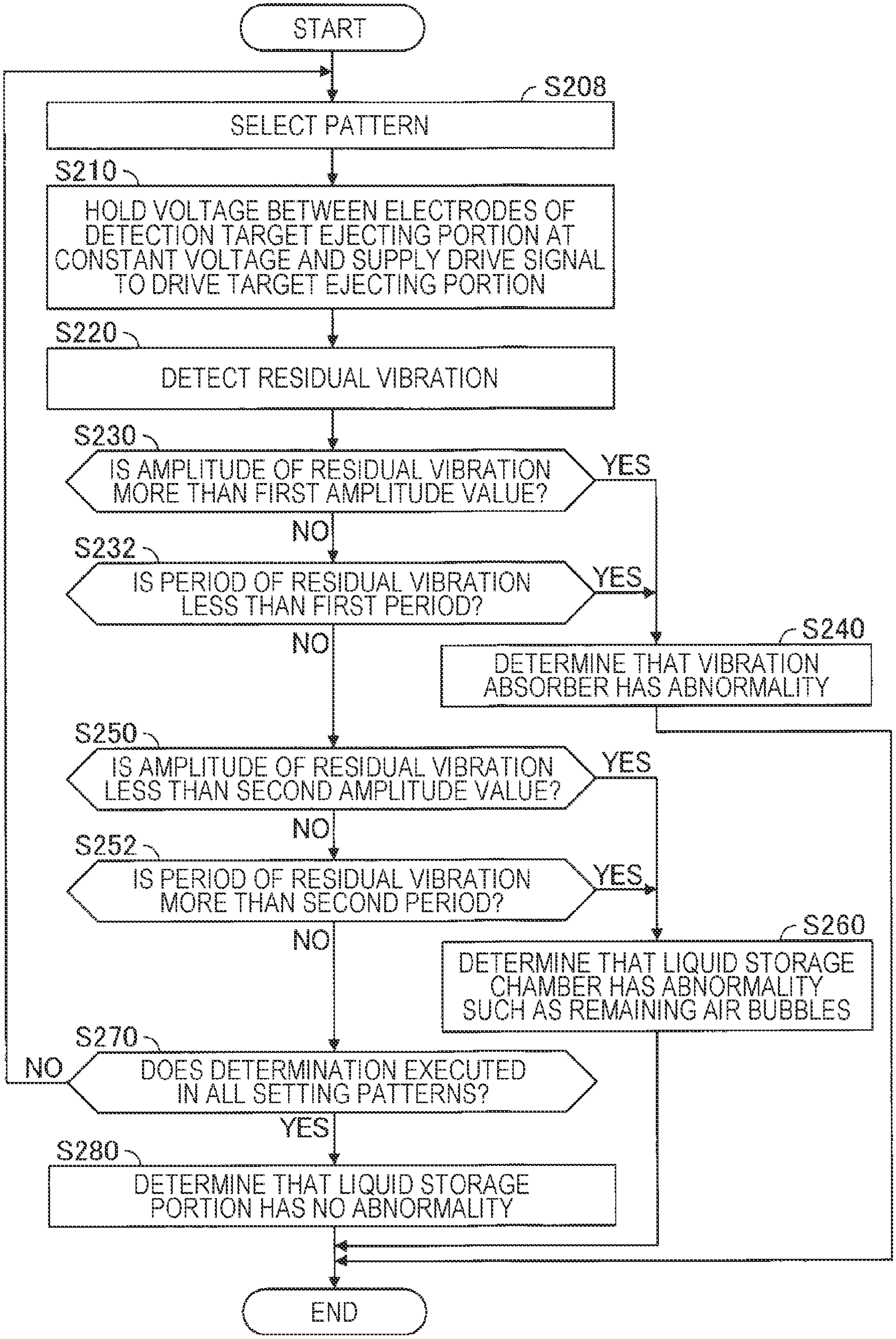
FIG. 15 is a flowchart illustrating an example of a storage portion determination process according to the second modification example.

FIG. 14 is a flowchart illustrating an example of an operation of the ink jet printer 1 according to a second modification example. FIG. 14 illustrates an operation flow of the ink jet printer 1 when determining whether or not the liquid storage portion R has an abnormality. Detailed descriptions of a process having the same manner as the process described with reference to FIG. 11 to FIG. 13 will be omitted. The operation illustrated in FIG. 14 has the same manner as the operation illustrated in FIG. 13, except that a process in step S124 and step S132 is executed instead of the process in step S122 and step S130 illustrated in FIG. 13. Meanwhile, as illustrated in FIG. 15, a storage portion determination process in step S202 is different from the storage portion determination process illustrated in FIG. 12 in that a process in steps S208 and S270 is added to the storage portion determination process illustrated in FIG. 12.

After executing the process in step S100, the control unit 2 shifts the process to step S124.

In step S124, the control unit 2 determines whether or not the number of abnormal ejecting portions D is equal to or more than a predetermined number.

When a result of determination in step S124 is positive, in step S140, the control unit 2 notifies that the ejecting portion D has an abnormality and the storage portion determination process is not executed, and ends the operation illustrated in FIG. 14.

On the other hand, when the result of the determination in step S124 is negative, the control unit 2 shifts the process to step S132.

In step S132, the control unit 2 sets a plurality of combination patterns of the detection target ejecting portion D and the drive target ejecting portion D among the normal ejecting portions D. Hereinafter, the plurality of combination patterns set in step S132 may be referred to as setting patterns.

Here, when setting the plurality of combination patterns of the detection target ejecting portion D and the drive target ejecting portion D, the ejecting portions D to be set as the detection target ejecting portions D are preferably different from each other in all the combination patterns. Further, the number of ejecting portions D to be set as the drive target ejecting portion D is preferably the same in all the combination patterns. More preferably, the ejecting portion D to be set as the drive target ejecting portion D is common in all the combination patterns. That is, it is more preferable that the number and positions of the ejecting portions D to be set as the drive target ejecting portion D be equal in all the combination patterns.

After executing the process in step S132, the control unit 2 shifts the process to step S202.

FIG. 15 is a flowchart illustrating an example of a storage portion determination process according to the second modification example. A process in step S208 illustrated in FIG. 15 is executed after the process in step S132 illustrated in FIG. 14 is executed. Further, for example, ending of the storage portion determination process illustrated in FIG. 15 means that the process proceeds to step S300 illustrated in FIG. 14.

The storage portion determination process illustrated in FIG. 15 has the same manner as the storage portion determination process illustrated in FIG. 12, except that the process in step S208 and a process in step S270 are added to the storage portion determination process illustrated in FIG. 12. In addition, in the storage portion determination process illustrated in FIG. 15, a case is assumed in which reference information indicating a reference value including a first amplitude value, a second amplitude value, a first period, and a second period based on an amplitude and a period of a residual vibration, which is assumed to occur when the liquid storage portion R is normal, is stored in advance in the storage unit 5.

First, in step S208, the control unit 2 selects one pattern from the plurality of setting patterns set in step S132 illustrated in FIG. 14. A series of processes from step S210 to step S260 is executed with a combination of the detection target ejecting portion D and the drive target ejecting portion D corresponding to the pattern selected in step S208. The series of processes from step S210 to step S260 is the same as the series of processes from step S210 to step S260 illustrated in FIG. 12. Meanwhile, a process executed when a result of determination in step S252 is negative is different from the storage portion determination process illustrated in FIG. 12.

For example, when the result of the determination in step S252 is negative, the determination unit 6 shifts the process to step S270.

In step S270, the determination unit 6 determines whether or not determination on whether or not the liquid storage portion R has an abnormality is executed in all the setting patterns.

When a result of the determination in step S270 is negative, the determination unit 6 returns the process to step S208, and selects one pattern from setting patterns on which the determination on whether or not the liquid storage portion R has an abnormality is not executed, among the plurality of setting patterns.

On the other hand, when the result of the determination in step S270 is positive, in step S280, the determination unit 6 determines that there is no abnormality in the liquid storage portion R, transmits the determination result information Rinf indicating the determination result to the control unit 2, and ends the storage portion determination process illustrated in FIG. 15.

In this manner, in the storage portion determination process illustrated in FIG. 15, until an abnormality of the vibration absorber 39 is detected in any one of the plurality of setting patterns, or until an abnormality such as remaining air bubbles in the liquid storage chamber RS is detected in any one of the plurality of setting patterns, the series of processes from step S210 to step S260 is repeated. When the series of processes from step S210 to step S260 are executed for all the setting patterns, and an abnormality of the liquid storage portion R is not detected in any one of the setting patterns, as described above, it is determined that there is no abnormality in the liquid storage portion R, and the storage portion determination process is ended.

The storage portion determination process in step S202 illustrated in FIG. 14 is not limited to the example illustrated in FIG. 15.

Figure 16:
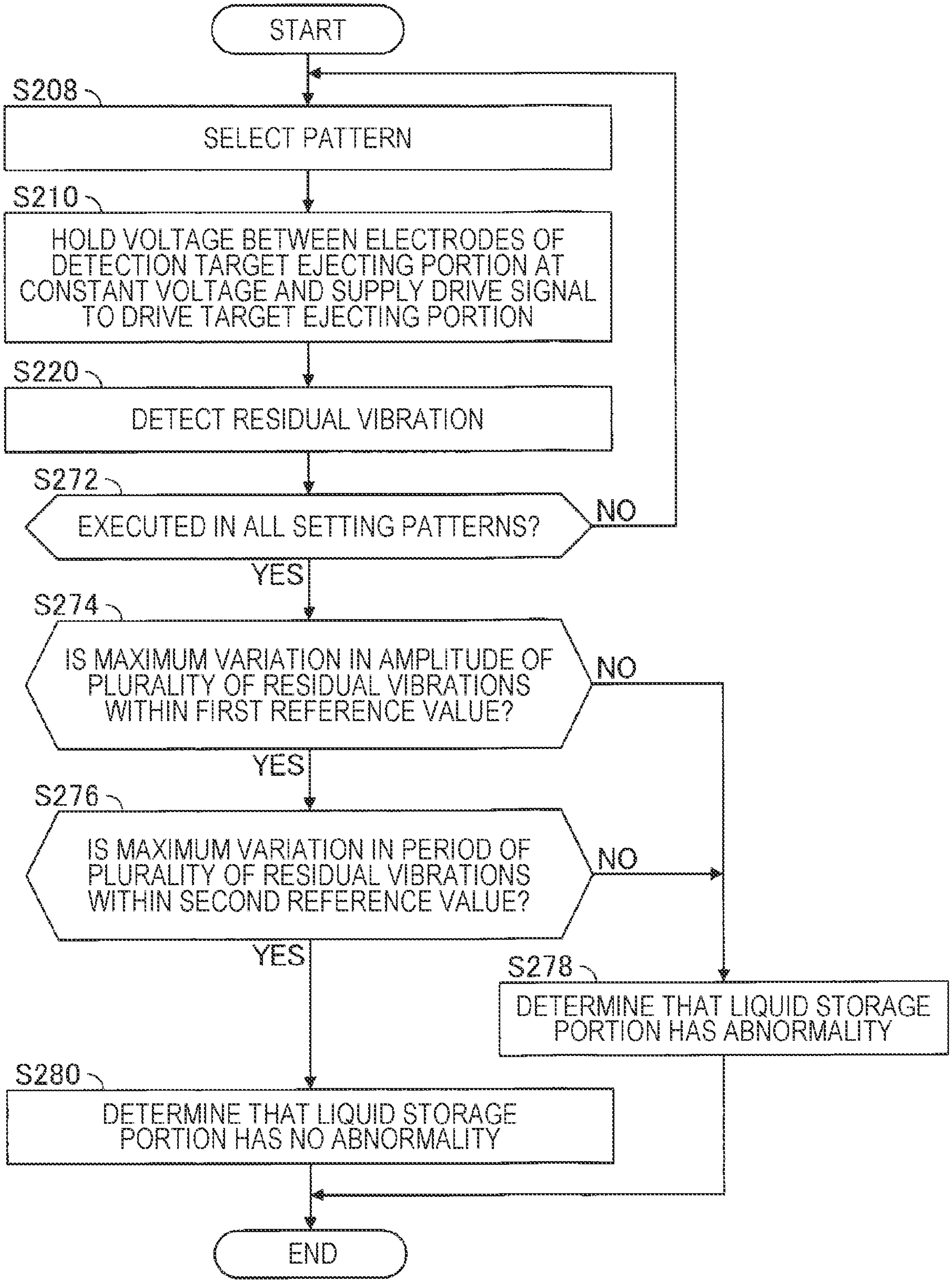
FIG. 16 is a flowchart illustrating another example of the storage portion determination process according to the second modification example.

FIG. 16 is a flowchart illustrating another example of the storage portion determination process according to the second modification example. A process in step S208 illustrated in FIG. 16 is executed after the process in step S132 illustrated in FIG. 14 is executed. Further, for example, ending of the storage portion determination process illustrated in FIG. 16 means that the process proceeds to step S300 illustrated in FIG. 14.

In the storage portion determination process illustrated in FIG. 16, a case is assumed in which a variation in amplitude and period of a residual vibration, which is assumed to occur when the liquid storage portion R is normal, is set as a reference value. For example, in the storage portion determination process illustrated in FIG. 16, a case is assumed in which reference information indicating a first reference value that is a reference value of a variation in amplitude value and a second reference value that is a reference value of a variation in period is stored in advance in the storage unit 5.

Here, when a residual vibration is detected in a plurality of combination patterns of the detection target ejecting portion D and the drive target ejecting portion D and the liquid storage portion R has an abnormality, a variation in parameter such as an amplitude and a period of the detected residual vibration becomes large depending on a location of the detection target ejecting portion D. That is, the fact that the variation in parameter of the residual vibration is small depending on the location of the detection target ejecting portion D indicates that the liquid storage portion R is normal. Therefore, in the storage portion determination process illustrated in FIG. 16, whether or not the liquid storage portion R has the abnormality is determined based on the variation in parameter of the residual vibration.

First, in step S208, the control unit 2 selects one pattern from the plurality of setting patterns set in step S132 illustrated in FIG. 14.

A series of processes in steps S210 and S220 is the same as the processes in steps S210 and S220 illustrated in FIG. 12. For example, in the process in step S210, the drive signal COMat is supplied to the drive target ejecting portion D in a state where a voltage between the upper electrode Zu and the lower electrode Zd of the inspection target ejecting portion D is held at a constant voltage. With the process in step S220, a residual vibration of the inspection target ejecting portion D is detected. Each time the series of processes in steps S210 and S220 is executed, information indicating the amplitude and period of the residual vibration of the inspection target ejecting portion D is stored in, for example, the storage unit 5. After executing the process in step S220, the control unit 2 shifts the process to step S272.

In step S272, the determination unit 6 determines whether or not the detection of a residual vibration is executed in all the setting patterns.

When a result of the determination in step S272 is negative, the determination unit 6 returns the process to step S208. On the other hand, when the result of the determination in step S272 is positive, the determination unit 6 shifts the process to step S274.

In step S274, the determination unit 6 determines whether or not the maximum variation in amplitude of a plurality of residual vibrations detected corresponding to the plurality of setting patterns is within the first reference value.

When a result of determination in step S274 is negative, in step S278, the determination unit 6 determines that the liquid storage portion R has an abnormality, transmits the determination result information Rinf indicating the determination result to the control unit 2, and ends the storage portion determination process illustrated in FIG. 16. On the other hand, when the result of the determination in step S274 is positive, the determination unit 6 shifts the process to step S276.

In step S276, the determination unit 6 determines whether or not the maximum variation in period of the plurality of residual vibrations detected corresponding to the plurality of setting patterns is within the second reference value.

When a result of determination in step S276 is negative, in step S278, the determination unit 6 determines that the liquid storage portion R has an abnormality, transmits the determination result information Rinf indicating the determination result to the control unit 2, and ends the storage portion determination process illustrated in FIG. 16.

On the other hand, when the result of the determination in step S276 is positive, in step S280, the determination unit 6 determines that there is no abnormality in the liquid storage portion R, transmits the determination result information Rinf indicating the determination result to the control unit 2, and ends the storage portion determination process illustrated in FIG. 16.

As described above, also in the present modification example, the same effect as the effect of the embodiment and modification example described above can be obtained.

Further, in the present modification example, the storage portion determination process including the control period TSu1 and the control period TSu2 is executed a plurality of times, in each of the plurality of times of storage portion determination process, a different ejecting portion D is set as the detection target ejecting portion D, and whether or not the head unit 3 has an abnormality is determined based on a residual vibration detected in each control period TSu2 of the plurality of times of storage portion determination process. In this manner, in the present modification example, the storage portion determination process is executed a plurality of times with the different ejecting portion D as the detection target ejecting portion D. Therefore, in the present modification example, it is possible to reduce a case in which the abnormality of the liquid storage portion R is not detected.

In addition, in the present modification example, the number of drive target ejecting portions D may be equal in the plurality of times of storage portion determination process. In this case, detection conditions for the residual vibration can be aligned in the plurality of times of storage portion determination process. Therefore, in the present modification example, it is possible to reduce a variation in accuracy of determination on whether or not the liquid storage portion R has an abnormality in the plurality of times of storage portion determination process. Therefore, in the present modification example, for example, when determining whether or not the liquid storage portion R has an abnormality based on the variation in parameter of the residual vibration due to the location of the detection target ejecting portion D, it is possible to reduce a decrease in accuracy of determination on whether or not the liquid storage portion R has an abnormality.

In addition, in the present modification example, the same ejecting portion D may be set as the drive target ejecting portion D in each of the plurality of times of storage portion determination process. In this case, in the plurality of times of storage portion determination process, the detection conditions for the residual vibration can be more aligned than when only the numbers of drive target ejecting portions D are aligned. Therefore, in the present modification example, it is possible to reduce a variation in accuracy of determination on whether or not the liquid storage portion R has an abnormality in the plurality of times of storage portion determination process. Therefore, in the present modification example, for example, when determining whether or not the liquid storage portion R has an abnormality based on the variation in parameter of the residual vibration due to the location of the detection target ejecting portion D, it is also possible to accurately determine whether or not the liquid storage portion R has an abnormality.

Third Modification Example

In the embodiment and modification example described above, a voltage between the upper electrode Zu and the lower electrode Zd of the ejecting portion D adjacent to the detection target ejecting portion D may be held at a constant voltage in the storage portion determination period TSu. For example, when a partition wall of the pressure chamber CV is thin, there is a possibility that detection of a residual vibration of the detection target ejecting portion D is affected by a pressure vibration transmitted from the partition wall of the pressure chamber CV of the drive target ejecting portion D adjacent to the detection target ejecting portion D to the pressure chamber CV of the detection target ejecting portion D.

Therefore, in the present modification example, for example, among the M ejecting portions D, the ejecting portion D which is an ejecting portion D adjacent to the detection target ejecting portion D and is different from the drive target ejecting portion D is set as the halt target ejecting portion D. Alternatively, among the M ejecting portions D, a plurality of ejecting portions D which are continuously arranged adjacent to the detection target ejecting portion D and are different from the drive target ejecting portion D may be set as a plurality of halt target ejecting portions D. In the present modification example, a voltage between the upper electrode Zu and the lower electrode Zd of one or the plurality of halt target ejecting portions D is held at a constant voltage in the storage portion determination period TSu. Therefore, in the present modification example, even when the partition wall of the pressure chamber CV is thin, the transmission of the pressure vibration from the partition wall of the pressure chamber CV of the drive target ejecting portion D to the pressure chamber CV of the detection target ejecting portion D can be reduced. As a result, in the present modification example, even when the partition wall of the pressure chamber CV is thin, it is possible to reduce a decrease in accuracy of determination on whether or not the liquid storage portion R has an abnormality.

The number of halt target ejecting portions D may be determined based on, for example, a thickness of the partition wall of the pressure chamber CV. Meanwhile, the number of drive target ejecting portions D is preferably more than the number of halt target ejecting portions D. In this case, it is possible to reduce a magnitude of a pressure fluctuation of the ink stored in the liquid storage portion R, which occurs by driving the drive target ejecting portion D, from becoming excessively small. The halt target ejecting portion D is an example of a "third ejecting portion".

Figure 17:
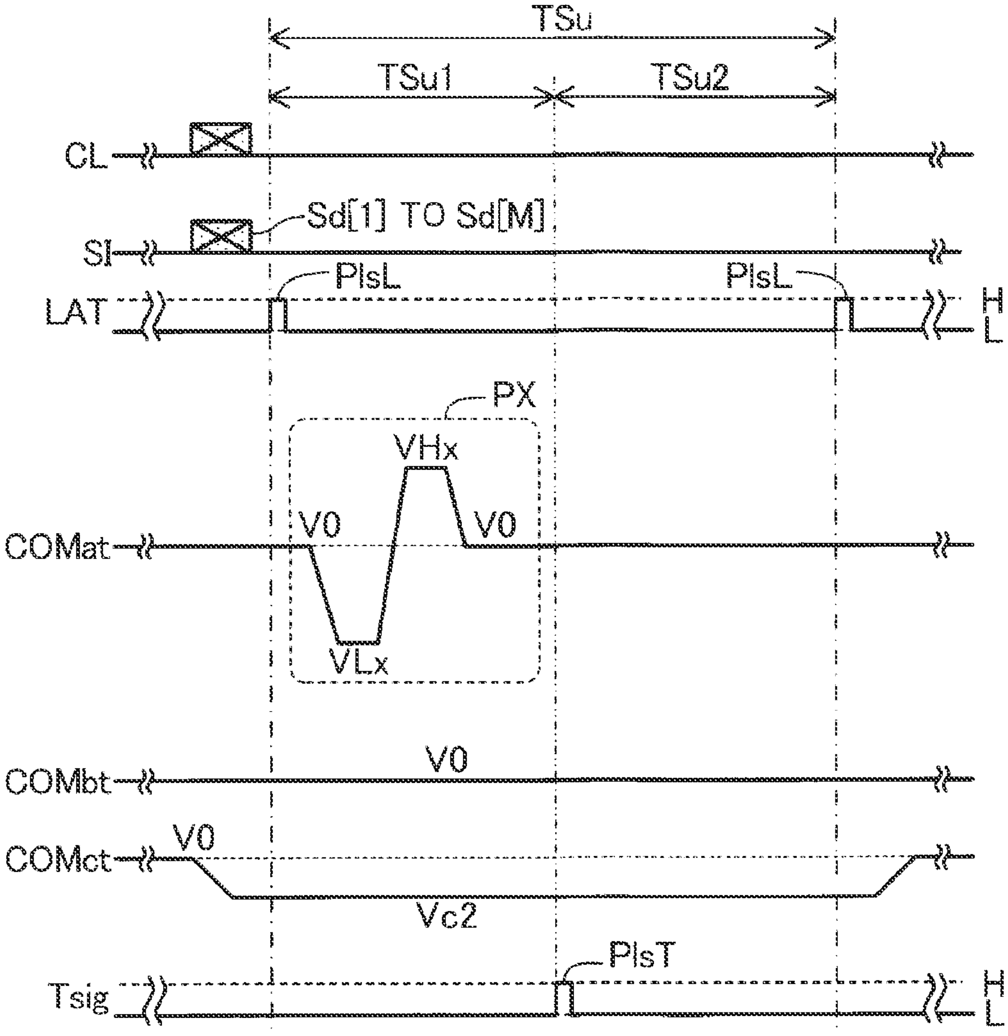
FIG. 17 is a timing chart illustrating an example of an operation of an ink jet printer according to a third modification example.

FIG. 17 is a timing chart illustrating an example of an operation of the ink jet printer 1 according to a third modification example. FIG. 17 illustrates a timing chart illustrating an example of an operation of the ink jet printer 1 in the storage portion determination period TSu. The timing chart illustrated in FIG. 17 has the same manner as the timing chart illustrated in FIG. 8, except that a drive signal COMct is supplied to the halt target ejecting portion D in the storage portion determination period TSu.

The drive signal COMct is a signal that holds, for example, a potential of a wiring Lc illustrated in FIG. 18 (to be described below) at the potential Vc2 lower than the reference potential V0 in the control periods TSu1 and TSu2. For example, a waveform of the drive signal COMct may be a waveform such that a potential is displaced to the potential Vc2 before a start of the storage portion determination period TSu, is maintained at the potential Vc2 in the storage portion determination period TSu, and is returned to the reference potential V0 after an end of the storage portion determination period TSu. Alternatively, the waveform of the drive signal COMct may be a waveform such that a potential is maintained as it is after the potential is displaced from the reference potential V0 to the potential Vc2 in the control period TSu1, is maintained at the potential Vc2 during detection of the detection signal Vout in the control period TSu2, and then returned to the reference potential V0 at a timing that does not affect the detection of the detection signal Vout. The potential held constant by the drive signal COMct is not limited to the potential Vc2. In addition, in the example illustrated in FIG. 17, the potential Vc2 is a potential lower than the reference potential V0, and the waveform of the drive signal COMct may be a waveform held at a potential higher than the reference potential V0 in the storage portion determination period TSu.

In the present modification example, a case is assumed in which the drive signal COMbt is supplied to the detection target ejecting portion D and the drive signal COMct is supplied to the halt target ejecting portion D. Meanwhile, an aspect of the present modification example is not limited to this. For example, the drive signal COMct may be supplied to the detection target ejecting portion D, and the drive signal COMbt may be supplied to the halt target ejecting portion D. Alternatively, the drive signal COMbt may be supplied to both the detection target ejecting portion D and the halt target ejecting portion D, or the drive signal COMct may be supplied to both the detection target ejecting portion D and the halt target ejecting portion D.

Figure 18:
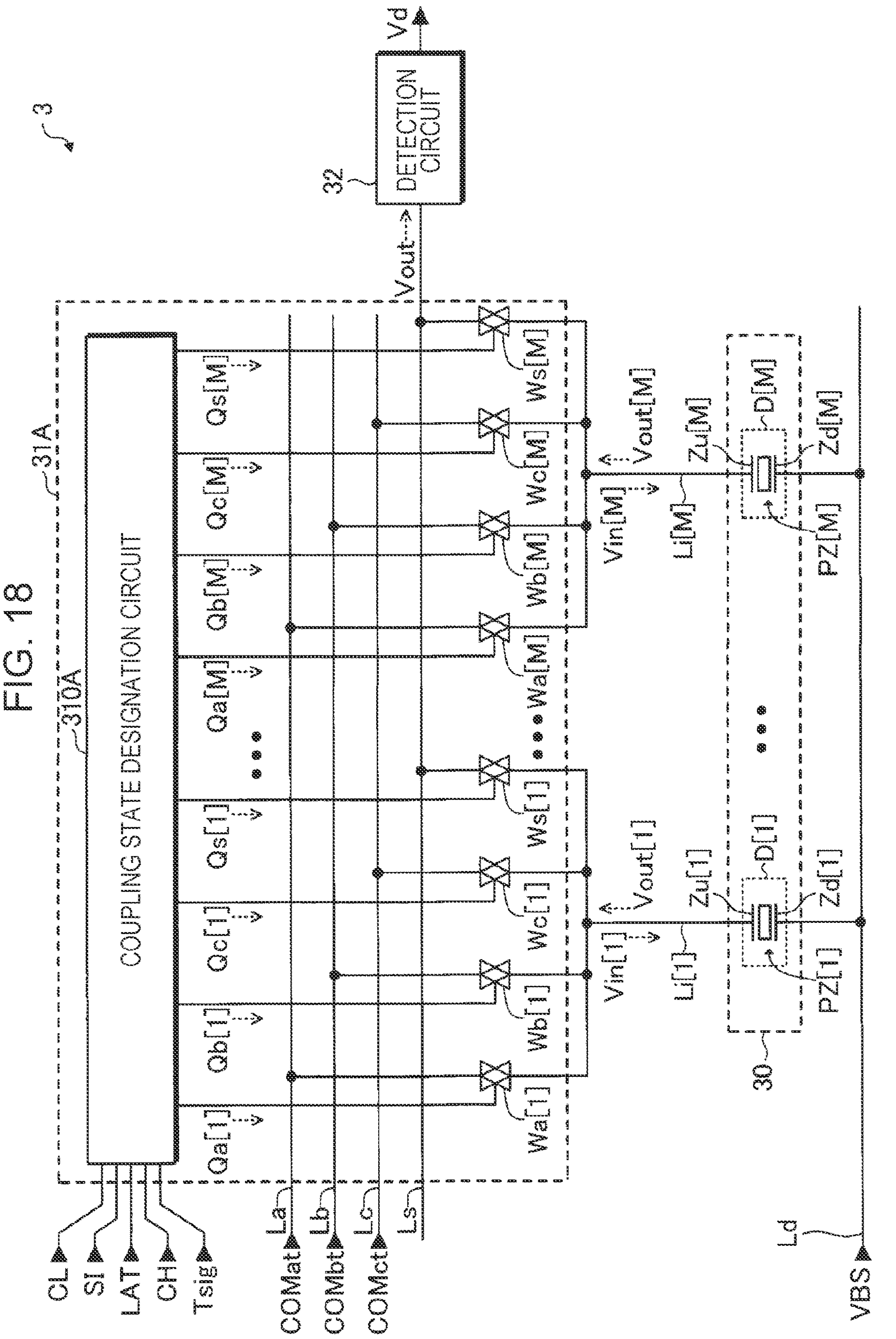
FIG. 18 is a block diagram illustrating an example of a configuration of a head unit according to the third modification example.

FIG. 18 is a block diagram illustrating an example of a configuration of the head unit 3 according to the third modification example. The same elements as those described in FIG. 5 are designated by the same reference numerals, and detailed descriptions thereof will be omitted.

Figure 5:
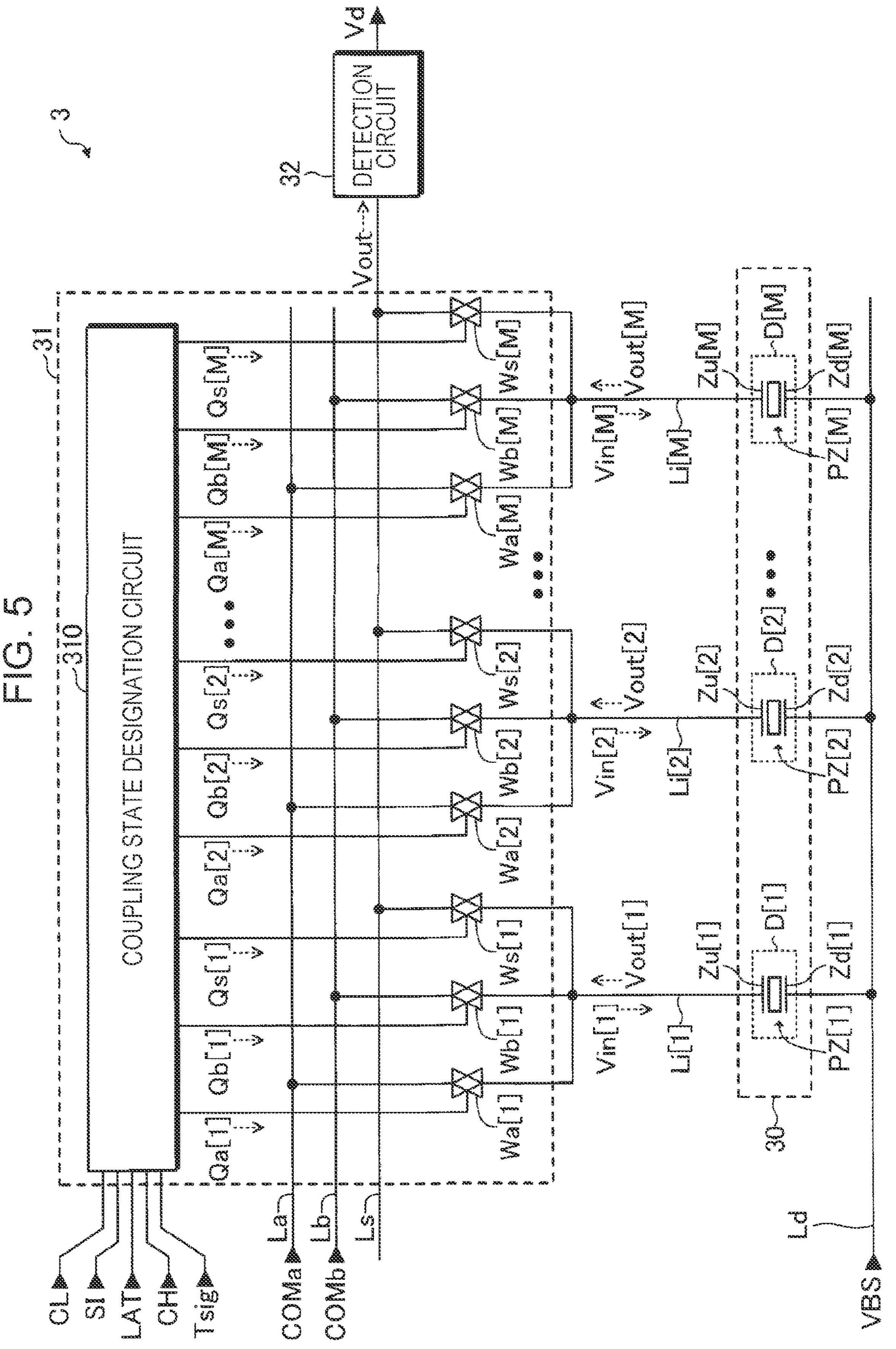
FIG. 5 is a block diagram illustrating an example of a configuration of the head unit.

The head unit 3 illustrated in FIG. 18 has the same manner as the head unit 3 illustrated in FIG. 5, except that a switching circuit 31A is provided instead of the switching circuit 31 illustrated in FIG. 5 and the wiring Lc to which the drive signal COMct is supplied from the drive signal generation unit 4 is provided. The switching circuit 31A has the same manner as the switching circuit 31, except that the switching circuit 31A includes a coupling state designation circuit 310A instead of the coupling state designation circuit 310 illustrated in FIG. 5, and has M switches Wc[1] to Wc[M] corresponding to the M ejecting portions D[1] to D[M] on a one-to-one basis.

The coupling state designation circuit 310A has the same manner as the coupling state designation circuit 310 illustrated in FIG. 5, except that a coupling state of each of the M switches Wc is designated. That is, the coupling state designation circuit 310A designates a coupling state of each of the M switches Wa, the M switches Wb, the M switches Wc, and the M switches Ws. For example, the coupling state designation circuit 310A may generate coupling state designation signals Qa[m], Qb[m], Qc[m], and Qs[m], based on at least some of the printing signal SI, a latch signal LAT, a change signal CH, and a period defining signal Tsig supplied from the control unit 2. The coupling state designation signal Qc[m] is a signal for designating ON and OFF of the switch Wc[m].

The switch Wc[m] switches conduction and non-conduction between the wiring Lc and the upper electrode Zu[m] of the piezoelectric element PZ[m] provided in the ejecting portion D[m] based on the coupling state designation signal Qc[m]. That is, the switch Wc[m] switches conduction and non-conduction between the wiring Lc and the wiring Li[m] coupled to the upper electrode Zu[m], based on the coupling state designation signal Qc[m]. In the present modification example, the switch Wc[m] is turned on when the coupling state designation signal Qc[m] is at a high level, and is turned off when the coupling state designation signal Qc[m] is at a low level. When the switch Wc[m] is turned on, the drive signal COMct supplied to the wiring Lc is supplied to the upper electrode Zu[m] of the ejecting portion D[m] as the individual drive signal Vin[m] via the wiring Li[m].

The configuration of the head unit 3 according to the third modification example is not limited to the example illustrated in FIG. 18. For example, when the common drive signal COM is supplied to both the detection target ejecting portion D and the halt target ejecting portion D, the head unit 3 according to the third modification example is the same as the head unit 3 illustrated in FIG. 5.

Although not particularly illustrated, the drive signal generation unit 4 according to the present modification example has the same manner as the drive signal generation unit 4 illustrated in FIG. 1, except that the drive signal COMct is generated as the drive signal COM, in addition to the drive signal COMa and the like, based on the waveform designation signal dCOM.

Next, with reference to FIG. 19, a relationship between a value indicated by a 3-bit digital signal of the individual designation signal Sd[m] and the coupling state designation signals Qa[m], Qb[m], Qc[m], and Qs[m] will be described.

FIG. 19 is an explanatory diagram illustrating generation of the coupling state designation signals Qa[m], Qb[m], Qc[m], and Qs[m] by the coupling state designation circuit 310A. As described with reference to FIG. 8, the individual designation signal Sd[m] designates a driving aspect of the ejecting portion D[m] by a value indicated by a 3-bit digital signal. Further, the value i, the value j, and the value k are values indicated by the variable m, in the same manner as in FIG. 9.

The individual designation signal Sd[m] indicates any one of a value "6" for designating an operation as the detection target ejecting portion D, a value "7" for designating an operation as the drive target ejecting portion D, and a value "8" for designating an operation as the halt target ejecting portion D, in the storage portion determination period TSu. When the individual designation signal Sd[m] indicates the value "6", the coupling state designation circuit 310A sets the coupling state designation signal Qb[m] to a high level in the control period TSu1, and sets the coupling state designation signal Qs[m] to a high level in the control period TSu2. When the individual designation signal Sd[m] indicates the value "7", the coupling state designation circuit 310A sets the coupling state designation signal Qa[m] to a high level in the control periods TSu1 and TSu2. When the individual designation signal Sd[m] indicates the value "8", the coupling state designation circuit 310A sets the coupling state designation signal Qc[m] to a high level in the control periods TSu1 and TSu2. When the above conditions are not satisfied, the coupling state designation circuit 310A sets each signal to a low level.

As described above, also in the present modification example, the same effect as the effect of the embodiment and modification example described above can be obtained.

Fourth Modification Example

Although it is assumed that the ink jet printer 1 includes four head units 3 in the embodiment and modification examples described above, the present disclosure is not limited to such an aspect. For example, the ink jet printer 1 may have one or more and three or less head units 3, or may have five or more head units 3.

Fifth Modification Example

Although the ink jet printer 1 is illustrated as a serial printer in the embodiments and modification examples described above, the present disclosure is not limited to such an aspect. For example, the ink jet printer 1 may be a so-called line printer in which a plurality of nozzles N are provided to extend wider than a width of the recording paper sheet PP in the head unit 3. In the present modification example as well, the same effect as the effect of the embodiment and modification examples described above can be obtained.

What is claimed is:

1. An abnormality determination method for a liquid ejecting head that includes a liquid storage portion that is configured to store a liquid, and a plurality of ejecting portions including at least a first ejecting portion and a second ejecting portion that is different than the first ejecting portion, wherein each of the plurality of ejecting portions includes a nozzle that ejects the liquid, a pressure chamber that communicates with the nozzle, a first electrode, a second electrode, a piezoelectric body that is disposed between the first electrode and the second electrode and is driven to apply a pressure fluctuation to the liquid in the pressure chamber and an individual flow path, wherein the liquid storage portion communicates with the pressure chamber of each of the plurality of ejecting portions via the respective individual flow path, the method comprising:

in a first period, holding a constant voltage between the first electrode and the second electrode of the first ejecting portion;

supplying a drive signal including a drive pulse to one of the first electrode and the second electrode of the first ejecting portion in the first period, to thereby apply a pressure fluctuation to the liquid in the pressure chamber of the second ejecting portion;

in a second period following the first period, detecting a residual vibration resulting from the pressure change in the liquid in the pressure chamber of the second ejecting portion, the residual vibration occurring within the liquid of the pressure chamber of the first ejecting portion after vibration from the pressure change propagates from the pressure chamber of the second ejecting portion, through the individual flow path of the second ejecting portion, through the liquid storage portion, through the individual flow path of the first ejecting portion, and into the pressure chamber of the first ejecting portion; and determining whether or not the liquid ejecting head has an abnormality based on the residual vibration.

2. The abnormality determination method for a liquid ejecting head according to claim 1, wherein determining whether or not the liquid storage portion of the liquid ejecting head has an abnormality is based on the residual vibration.

3. The abnormality determination method for a liquid ejecting head according to claim 1, wherein the drive pulse is an ejection pulse for ejecting a droplet from the nozzle of the second ejecting portion.

4. The abnormality determination method for a liquid ejecting head according to claim 1, wherein in the second period, a voltage between the first electrode and the second electrode of the second ejecting portion is held at a constant voltage.

5. The abnormality determination method for a liquid ejecting head according to claim 1, further comprising:

determining, before the first period, whether or not each of the plurality of ejecting portions has an abnormality includes determining that the first ejecting portion is normal and determining that the second ejecting portion is normal, and in response to determining that the first ejecting portion is normal, selecting the first ejecting portion as the ejecting portion in which residual vibrations are to be detected in the first period; and in response to determining that the second ejecting portion is normal, selecting the second ejecting portion as the ejecting portion to which the drive signal is applied in the first period.

6. The abnormality determination method for a liquid ejecting head according to claim 1, the plurality of ejecting portions further including a third ejecting portion, which is an ejecting portion adjacent to the first ejecting portion and different from the second ejecting portion, the method further comprising:

in the first period and the second period, holding a constant voltage between the first electrode and the second electrode of the third ejecting portion.

7. The abnormality determination method for a liquid ejecting head according to claim 1, the plurality of ejecting portions further including a first subgroup of ejecting portions that are continuously arranged adjacent to the first ejecting portion and different than the second ejecting portion, the method further comprising:

in the first period and the second period, a voltage between the first electrode and the second electrode of each of the ejecting portions of the first subgroup.

8. The abnormality determination method for a liquid ejecting head according to claim 7, wherein the number of the second ejecting portions is more than the number of ejecting portions of the first subgroup.

9. The abnormality determination method for a liquid ejecting head according to claim 1, wherein the drive signal includes a plurality of drive pulses for applying a pressure fluctuation to the liquid in the pressure chamber of the second ejecting portion in the first period.

10. The abnormality determination method for a liquid ejecting head according to claim 1, wherein the detection including the first period and the second period is performed a plurality of times, in each of the plurality of times of the detection, a different ejecting portion is set as the first ejecting portion, and the determination of whether or not the liquid ejecting head has the abnormality is determined based on the residual vibration detected in the second period of each of the plurality of times of the detection.

11. The abnormality determination method for a liquid ejecting head according to claim 1, wherein whether or not the liquid ejecting head has the abnormality is determined based on a comparison result between a predetermined reference residual vibration and the residual vibration detected in the second period.

12. The abnormality determination method for a liquid ejecting head according to claim 1, wherein whether or not the liquid ejecting head has the abnormality is determined based on a comparison result between a reference amplitude value indicated by reference information prepared in advance and an amplitude value of the residual vibration detected in the second period.

13. The abnormality determination method for a liquid ejecting head according to claim 12, wherein the reference amplitude value is determined based on an amplitude value of a reference residual vibration measured in advance, the first ejecting portion in the first period and the second period is an ejecting portion at the same position as the first ejecting portion when the reference residual vibration is measured, and the second ejecting portion in the first period and the second period is an ejecting portion at the same position as the second ejecting portion when the reference residual vibration is measured.

14. The abnormality determination method for a liquid ejecting head according to claim 13, wherein the liquid storage portion includes a compliance portion that absorbs a vibration of the stored liquid, the reference amplitude value includes a first amplitude value, and when the amplitude value of the residual vibration detected in the second period is more than the first amplitude value, it is determined that the compliance portion has an abnormality.

15. The abnormality determination method for a liquid ejecting head according to claim 13, wherein the reference amplitude value includes a second amplitude value, and when the amplitude value of the residual vibration detected in the second period is less than the second amplitude value, it is determined that an air bubble exists in the liquid storage portion.

16. The abnormality determination method for a liquid ejecting head according to claim 1, wherein whether or not the liquid ejecting head has the abnormality is determined based on a comparison result between a reference period indicated by reference information prepared in advance and a period of the residual vibration detected in the second period.

17. The abnormality determination method for a liquid ejecting head according to claim 16, wherein the reference period is determined based on a period of a reference residual vibration measured in advance, the first ejecting portion in the first period and the second period is an ejecting portion at the same position as the first ejecting portion when the reference residual vibration is measured, and the second ejecting portion in the first period and the second period is an ejecting portion at the same position as the second ejecting portion when the reference residual vibration is measured.

18. The abnormality determination method for a liquid ejecting head according to claim 16, wherein the liquid storage portion includes a compliance portion that absorbs a vibration of the stored liquid, the reference period includes a first period, and when the period of the residual vibration detected in the second period is less than the first period, it is determined that the compliance portion has an abnormality.

19. The abnormality determination method for a liquid ejecting head according to claim 16, wherein the reference period includes a second period, and when an amplitude value of the residual vibration detected in the second period is more than the second period, it is determined that an air bubble exists in the liquid storage portion.

20. A liquid ejecting apparatus comprising:

a liquid ejecting head;

a determination portion that is configured to determine whether or not the liquid ejecting head has an abnormality; and a control portion that is configured to control the liquid ejecting head and the determination portion, wherein the liquid ejecting head includes a plurality of ejecting portions including at least a first ejecting portion and a second ejecting portion, each of the plurality of ejecting portions including a nozzle that ejects a liquid, a pressure chamber that communicates with the nozzle, a first electrode, a second electrode, a piezoelectric body that is disposed between the first electrode and the second electrode and is driven to apply a pressure fluctuation to the liquid in the pressure chamber, and an individual flow path, and a liquid storage portion that stores liquid and communicates with the pressure chamber of each of the plurality of ejecting portions via the respective individual flow path, the control portion is configured to control the liquid ejecting head to hold, in a first period, a constant voltage between the first electrode and the second electrode of the first ejecting portion, supply, in the first period, a drive signal including a drive pulse to one of the first electrode and the second electrode of the first ejecting portion, to thereby apply a pressure fluctuation to the liquid in the pressure chamber of the second ejecting portion, and detect, in a second period following the first period, a residual vibration resulting from the pressure change in the liquid in the pressure chamber of the second ejecting portion, the residual vibration occurring within the liquid of the pressure chamber of the first ejecting portion after vibration from the pressure change propagates from the pressure chamber of the second ejecting portion, through the individual flow path of the second ejecting portion, through the liquid storage portion, through the individual flow path of the first ejecting portion, and into the pressure chamber of the first ejecting portion, and the determination portion determines whether or not the liquid ejecting head has an abnormality based on the residual vibration.

* * * * *